US012480073B2

(12) United States Patent
Benson et al.

(10) Patent No.: US 12,480,073 B2
(45) Date of Patent: *Nov. 25, 2025

(54) ETHOXYLATED GLYCEROL ESTER-CONTAINING DETERGENT FOR MACHINE DISHWASHING

(71) Applicant: Clariant International Ltd., Muttenz (CH)

(72) Inventors: Hannah Benson, Heppenheim (DE); Felix Hövelmann, Mühldorf (DE); Dirk Leinweber, Kelkheim (DE)

(73) Assignee: CLARIANT INTERNATIONAL LTD, Muttenz (CH)

(*) Notice: Subject to any disclaimer, the term of this patent is extended or adjusted under 35 U.S.C. 154(b) by 912 days.

This patent is subject to a terminal disclaimer.

(21) Appl. No.: 17/614,279

(22) PCT Filed: May 26, 2020

(86) PCT No.: PCT/EP2020/064564

§ 371 (c)(1),
(2) Date: Nov. 24, 2021

(87) PCT Pub. No.: WO2020/239760

PCT Pub. Date: Dec. 3, 2020

(65) Prior Publication Data

US 2022/0213412 A1 Jul. 7, 2022

(30) Foreign Application Priority Data

May 28, 2019 (EP) .................................... 19177016

(51) Int. Cl.

| | |
|---|---|
| ***C11D 1/00*** | (2006.01) |
| ***C08G 65/26*** | (2006.01) |
| ***C11D 1/72*** | (2006.01) |
| ***C11D 1/722*** | (2006.01) |
| ***C11D 3/00*** | (2006.01) |

(Continued)

(52) U.S. Cl.

CPC ........ *C11D 3/2093* (2013.01); *C08G 65/2615* (2013.01); *C08G 65/2651* (2013.01); *C11D 1/72* (2013.01); *C11D 1/722* (2013.01); *C11D 3/0047* (2013.01); *C11D 3/044* (2013.01); *C11D 3/10* (2013.01); *C11D 3/2068* (2013.01); *C11D 3/37* (2013.01); *C11D 3/3707* (2013.01); *C11D 3/3753* (2013.01); *C11D 3/386* (2013.01); *C11D 3/3902* (2013.01); *C11D 17/042* (2013.01); *C11D 17/043* (2013.01); *C11D 17/044* (2013.01); *C11D 17/06* (2013.01); *C11D 2111/18* (2024.01)

(58) Field of Classification Search

CPC ........... C11D 1/72; C11D 1/722; C11D 3/044; C11D 3/10; C11D 3/2068; C11D 3/2093; C11D 3/37; C11D 3/3753; C11D 3/386; C11D 17/06; C11D 17/042; C11D 17/043; C11D 17/044; C11D 3/3902; B08B 3/08; B08B 3/10

USPC ....... 510/220, 221, 224, 226, 227, 228, 443, 510/445, 439, 505, 506; 134/25.2

See application file for complete search history.

(56) References Cited

U.S. PATENT DOCUMENTS

| | | | |
|---|---|---|---|
| 2,917,470 | A | 12/1959 | Bressler |
| 4,775,653 | A | 10/1988 | Leach |

(Continued)

FOREIGN PATENT DOCUMENTS

| | | | |
|---|---|---|---|
| AU | 2013293942 | B2 | 9/2016 |
| CA | 2762583 | A1 | 6/2013 |

(Continued)

OTHER PUBLICATIONS

International Search Report and Written Opinion issued in App. No. PCT/EP2020/064564, mailing date Nov. 17, 2020, 18 pages.

(Continued)

*Primary Examiner* — Gregory R Delcotto

(57) ABSTRACT

A detergent composition for machine dishwashing comprising Z1) one or more ethoxylated glycerol esters of formula (I), (I)

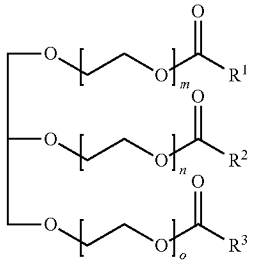

prepared from ethylene oxide and one or more triglycerides of formula (II) in the presence of a calcium catalyst (C), characterized in that R1, R2 and R3 in formulae (I) and (II) are equal or different and are independently selected from saturated or unsaturated, linear or branched C7-C24 alkyl chains; m, n and o in formula (I) are equal or different and are each independently an integer number from 1 to 200 with the proviso that the number-average of the sum of m+n+o is greater than 5; and the calcium catalyst (C) is a catalyst obtainable by a reaction involving (A) calcium hydroxide and (B) a carboxylic acid comprising 3 to 40 carbon atoms, wherein the molar ratio of calcium hydroxide (A) to carboxylic acid (B) in the preparation of the catalyst (C) is from 1:1 to 1:5.

18 Claims, No Drawings

(51) Int. Cl.

| | |
|---|---|
| ***C11D 3/04*** | (2006.01) |
| ***C11D 3/10*** | (2006.01) |
| ***C11D 3/20*** | (2006.01) |
| ***C11D 3/37*** | (2006.01) |
| ***C11D 3/386*** | (2006.01) |
| ***C11D 3/39*** | (2006.01) |
| ***C11D 3/395*** | (2006.01) |
| ***C11D 17/04*** | (2006.01) |
| ***C11D 17/06*** | (2006.01) |

(56) References Cited

U.S. PATENT DOCUMENTS

| | | | |
|---|---|---|---|
| 4,820,673 | A | 4/1989 | Knopf |
| 4,835,321 | A | 5/1989 | Leach |
| 5,386,045 | A | 1/1995 | Aeschbacher |
| 5,600,020 | A | 2/1997 | Wehle |
| 5,627,121 | A | 5/1997 | Lin |
| 5,840,995 | A | 11/1998 | Mayer |
| 5,998,355 | A | 12/1999 | Brumbaugh |
| 6,239,091 | B1 | 5/2001 | Tartakovsky |
| 6,365,541 | B1 | 4/2002 | Wimmer |
| 9,056,828 | B2 | 6/2015 | Kolano |
| 2005/0240064 | A1 | 10/2005 | Weerasooriya |
| 2008/0249330 | A1 | 10/2008 | Smith |
| 2010/0160204 | A1 | 6/2010 | Zipfel |
| 2013/0316939 | A1 | 11/2013 | Moragas Arjant |
| 2018/0105770 | A1* | 4/2018 | Acikalin .............. C11D 1/8255 |
| 2018/0243730 | A1 | 8/2018 | Niikura |

FOREIGN PATENT DOCUMENTS

| | | | |
|---|---|---|---|
| CN | 1071413 | A | 4/1993 |
| CN | 1207760 | A | 2/1999 |
| DE | 605973 | | 11/1934 |
| DE | 3914131 | A1 | 10/1990 |
| DE | 10032612 | A1 | 2/2002 |
| EP | 0077588 | A1 | 4/1983 |
| EP | 0361621 | | 4/1990 |
| EP | 0453967 | | 10/1991 |
| EP | 0289159 | B1 | 12/1992 |
| EP | 1045021 | A1 | 10/2000 |
| EP | 1757676 | A1 | 2/2007 |
| EP | 1919616 | | 5/2008 |
| EP | 2029711 | | 3/2009 |
| EP | 2125681 | | 12/2009 |
| EP | 2181763 | A1 | 5/2010 |
| EP | 2446743 | | 5/2012 |
| EP | 2446743 | A1 | 5/2012 |
| EP | 2633008 | | 9/2013 |
| EP | 2666848 | A1 | 11/2013 |
| EP | 3157674 | | 4/2017 |
| GB | 1233299 | | 5/1971 |
| JP | S641794 | A | 1/1989 |
| JP | 2023048801 | | 4/2023 |
| PL | 166429 | | 5/1995 |
| WO | 9718284 | A2 | 5/1997 |
| WO | 0238269 | A1 | 5/2002 |
| WO | 2005075621 | A1 | 8/2005 |
| WO | 2005097963 | A1 | 10/2005 |
| WO | 2006025898 | | 3/2006 |
| WO | 2007073801 | A1 | 7/2007 |
| WO | 2012042001 | A1 | 4/2012 |
| WO | 2013154189 | | 10/2013 |
| WO | 2015163347 | | 10/2015 |
| WO | 2022010906 | | 1/2022 |

OTHER PUBLICATIONS

Co-Pending U.S. Application U.S. Appl. No. 17/614,209.

Furukawa, J., & Saegusa, T. (1963). Polymerization of Aldehydes and Oxides. Wiley-Interscience, New York.

International Search Report and Written Opinion for App. No. PCT/EP2020/064544, mailing date Jul. 27, 2020, 15 pages.

M. Raii et al., "Rheological Behavior of Gypsum, Plaster, and Hydroxyapatite Gel Blends," Ind. Eng. Chem. Res., 51(34), 11163-69 (2012).

N. Osterwalder et al., "Preparation of nano-gypsum from anhydrite nanoparticles: Strongly increased Vickers hardness and formation of calcium sulfate nano-needles," J. Nanoparticle Res., 9, 275-281 (2007).

Co-Pending U.S. Appl. No. 17/614,209.

* cited by examiner

ETHOXYLATED GLYCEROL ESTER-CONTAINING DETERGENT FOR MACHINE DISHWASHING

The present invention relates to a detergent composition, in particular useful for machine dishwashing, comprising one or more ethoxylated glycerol esters prepared in the presence of a specific calcium catalyst, a method for cleaning in particular dishes in a dishwashing machine with said detergent composition, the use of said detergent composition or of said ethoxylated glycerol ester as a rinse aid during machinated dishwashing, the use of said detergent composition or of said ethoxylated glycerol ester for improving the wettability of dishes, the use of said detergent composition or of said ethoxylated glycerol ester for the reduction and/or avoidance of stain and film formation on dishes, the machine compartment and/or the filter of the machine during machinated dishwashing, and the use of said ethoxylated glycerol ester for improving the rinse aiding properties and/or the drying capacity of a machine dishwashing detergent composition.

The requirements concerning machine-washed dishes are nowadays very high, especially when compared to manually washed dishes. Apart from residue-free cleaning, the complete washing program, typically comprising a pre-rinsing step, a main washing step, a final rinsing step and a drying step, each step often being interrupted by intermediate rinsing steps, should result in flawlessly glossy dishes free of stripes and stains. Even after proper removal of food remains from the dishes, white stains and residues derived from water hardness and other inorganic or organic salts stemming from water droplets and water films may lead to unsatisfactory dishwashing results. Therefore, rinse aids are employed in machinated dishwashing in order to improve the dishwashing performance in terms of obtaining stripe-free, stain-free and residue-free dishes. Rinse aids are typically automatically introduced from a rinse aid dispenser into the dish compartment of the dishwasher during the final rinse step. Alternatively, multi-functional detergent products often already include a rinse aid component.

Typical rinse aids are liquid mixtures of weakly foaming nonionic surfactants, organic acids such as citric acid, film-inhibiting polymers, solvents such as alcohols, and other additives such as hydrotropic agents, thickeners and/or foam inhibitors. Rinse aid formulations are usually liquid at 20° C. and have an acidic pH value of 6 or less. They are often added into the dish compartment of the dishwashing machine during the final rinsing step.

The object of rinse aids is to affect the interface and surface tension of water in such a way that it can run off the rinsed surfaces as a thin film, thus that during the subsequent drying step no water droplets, limestone scales, stipes, films or other residues remain on the washed dishes.

Dishwashing in dishwashing machines, especially for domestic applications, is subject to continuous technical changes and improvements. For example, new kinds of combined products ("all in one" formulations) are developed, such as single-phase or multiphase tablets, pouches, pods and caps, or liquid formulations such as multifunctional gels. Such combined products require new rinse aid additives that are effective against stain and film formation and show beneficial rinse aid and/or drying performance, while they are present during the entire washing process.

Often, polymers are used in such detergent compositions, and are useful as water softeners and/or rinse aid additives. Different nonionic, anionic, cationic or amphoteric polymers are described in the art.

DE 10032612 describes the use of specific copolymers from carboxylic acids, sulfonic acid-containing monomers and optionally additional ionic or nonionic monomers for improving the rinse aid and drying performance of detergents in machinated dishwashing.

WO 2007/073801, WO 2005/097963 and WO 2005/075621 disclose detergent compositions comprising positively charged polymers and specific additional components such as surfactants, chelating agents, whiteners as rinse aids in machinated dishwashing.

WO 2012/042001 describes detergent compositions comprising cationic polysaccharides and their use in machinated dishwashing for removing, reducing or preventing stains and/or films on glass.

U.S. Pat. No. 6,239,091 discloses detergent compositions comprising water-soluble cationic or amphoteric polymers and their use in machinated dishwashing for removing, reducing or preventing stains and/or films on glass.

EP-A 0077588 describes detergent compositions or rinse aids comprising nonionic surfactants and cationic polyelectrolytes.

EP-A 1045021 discloses a composition comprising a mixture of alkoxylated mono-, di- and triglycerides and glycerol and detergent composition therefrom.

JP64001794A discloses enzyme- and polyoxyalkylene-containing liquid detergents for dishwashers.

Although the number of effective detergent formulations known in the art is large and growing, the performance of the formulations needs still to be improved, especially in terms of rinse aid performance and/or drying performance of detergents for machinated dishwashing.

One object of the present invention is to provide a detergent for machinated dishwashing, which shows a beneficial cleaning performance, especially in terms of beneficial rinse aid performance and/or drying performance.

Surprisingly, it was found that this objective is met in a particularly effective manner, when specific ethoxylated glycerol esters are used in detergent compositions in particular for machinated dishwashing.

Therefore, an aspect of the invention is a detergent composition for machine dishwashing comprising:

Z1) one or more ethoxylated glycerol esters of formula (I), (I)

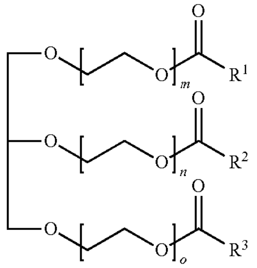

prepared from ethylene oxide and one or more triglycerides of formula (II)

(II)

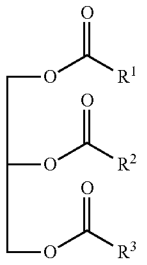

in the presence of a calcium catalyst (C), characterized in that $R^1$, $R^2$ and $R^3$ in formulae (I) and (II) are equal or different and are independently selected from saturated or unsaturated, linear or branched $C_7$-$C_{24}$ alkyl chains;

m, n and o in formula (I) are equal or different and are each independently an integer number from 1 to 200, preferably from 1 to 80, more preferably from 2 to 70, with the proviso that the number-average of the sum of m+n+o is greater than 5, preferably from 20 to 70, more preferably from 30 to 60; and the calcium catalyst (C) is a catalyst obtainable by a reaction involving (A) calcium hydroxide and (B) a carboxylic acid comprising 3 to 40 carbon atoms, wherein the molar ratio of calcium hydroxide (A) to carboxylic acid (B) in the preparation of the catalyst (C) is from 1:1 to 1:5.

While m, n and o are integer numbers in the formulae, the products described often are mixtures of various components.

Another aspect of the invention is a method of cleaning dishes in a dishwashing machine, in which contaminated dishes are treated in the dishwashing machine with an aqueous alkaline composition comprising the detergent composition described above.

Furthermore, an aspect of the invention relates to a method of cleaning dishes in a dishwashing machine, in which contaminated dishes are treated in the dishwashing machine with an aqueous composition at a pH ranging from 5.5-8.5 comprising the detergent composition described above.

An advantage of the invention is that the detergent composition of the invention and the ethoxylated glycerol ester Z1) defined above show very good results as rinse aids during machinated dishwashing, especially in terms of improving wettability of dishes and/or the reduction of stain and film formation on dishes, the compartment and/or the filter of the machine during machinated dishwashing.

Therefore, the present invention also provides the use of the detergent composition described above or of the ethoxylated glycerol ester Z1) as defined above for improving the wettability of dishes during machinated dishwashing.

The invention further provides the use of the detergent composition described above or of the ethoxylated glycerol ester Z1) as defined above for the reduction and/or avoidance of stain and film formation on dishes, the machine compartment and/or in the filter of the machine during machinated dishwashing.

In addition, the invention relates to the use of the ethoxylated glycerol ester Z1) as defined above for improving the rinse aiding properties and/or the drying capacity of a machine dishwashing detergent composition.

An important feature of the detergent composition of the invention is the presence of the component Z1), which is one or more ethoxylated glycerol esters of formula (I), (I)

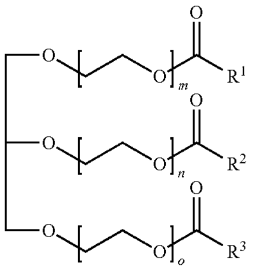

prepared from ethylene oxide and one or more triglycerides of formula (II)

(II)

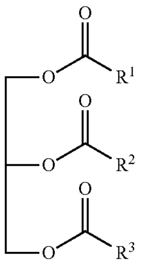

in the presence of a calcium catalyst (C), characterized in that $R^1$, $R^2$ and $R^3$ in formulae (I) and (II) are equal or different and are independently selected from saturated or unsaturated, linear or branched $C_7$-$C_{24}$ alkyl chains;

m, n and o in formula (I) are equal or different and are each independently an integer number from 1 to 200, preferably from 1 to 80, more preferably from 2 to 70, with the proviso that the number-average of the sum of m+n+o is greater than 5, preferably from 20 to 70, more preferably from 30 to 60; and the calcium catalyst (C) is a catalyst obtainable by a reaction involving (A) calcium hydroxide and (B) a carboxylic acid comprising 3 to 40 carbon atoms, wherein the molar ratio of calcium hydroxide (A) to carboxylic acid (B) in the preparation of the catalyst (C) is from 1:1 to 1:5.

In the preparation of the catalyst (C) the molar ratio of calcium hydroxyde (A) and the carboxylic acid (B) comprising 3 to 40 carbon atoms is from 1:1 to 1:5.

Preferably, the molar ratio (A):(B) is from 1:1.5 to 1:4, more preferably from 1:1.8 to 1:2.2, even more preferably 1:1.9 to 1:2.1. In a particularly preferred embodiment, the ratio of (A):(B) in the preparation of the catalyst (C) is approximately 1:2.

The reaction for the preparation of the catalyst (C) is preferably carried out in the presence of at least one polar solvent, more preferably a polar solvent comprising at least one hydroxyl group, even more preferably at least one alcohol having 1 to 5 carbon atoms or a mixture thereof with water. In a particularly preferred embodiment the polar solvent is propan-2-ol or a mixture thereof with water. In another particularly preferred embodiment the polar solvent is ethanol or a mixture thereof with water.

The acid used as the carboxylic acid (B) comprising 3 to 40 carbon atoms is preferably a carboxylic acid represented by formula (III) or formula (IV).

(III)

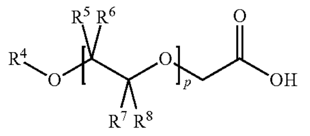

(IV)

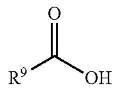

In formula (III) $R^4$ is typically selected from saturated or unsaturated, linear or branched $C_1$-$C_{30}$ alkyl groups, preferably $C_5$-$C_{20}$ alkyl groups, more preferably $C_8$-$C_{18}$ alkyl groups. $R^5$, $R^6$, Wand $R^8$ in formula (III) are equal or different and are independently selected from the group consisting of hydrogen, methyl and ethyl. Preferably $R^5$, $R^6$, $R^7$ and $R^8$ are hydrogen.

Moreover, p in formula (III) is an integer number from 0 to 20, preferably an integer number from 1 to 20, preferably an integer number from 1 to 11, more preferably an integer number from 2 to 5. In a preferred embodiment, in the carboxylic acid of formula (III) $R^4$ is a saturated or unsaturated, linear or branched $C_8$-$C_{18}$ alkyl group, $R^5$, $R^6$, $R^7$ and $R^8$ are hydrogen and p is an integer number from 1 to 11. In a further preferred embodiment, in the carboxylic acid of formula (III) $R^4$ is a saturated or unsaturated, linear or branched $C_8$-$C_{18}$ alkyl group, $R^5$, $R^6$, $R^7$ and $R^8$ are hydrogen and p is an integer number from 2 to 5.

In formula (IV) $R^9$ is selected from saturated or unsaturated, linear or branched $C_5$-$C_{30}$ alkyl group, preferably $C_8$-$C_{18}$ alkyl group, more preferably $C_8$-$C_{12}$ alkyl group. In a particularly preferred embodiment, the carboxylic acid of formula (IV) is iso-nonanoic acid.

More preferably, the carboxylic acid (B) comprising 3 to 40 carbon atoms is a carboxylic acid represented by formula (III), especially wherein $R^4$ is a saturated or unsaturated, linear or branched $C_8$-$C_{18}$ alkyl group, $R^5$, $R^6$, $R^7$ and Ware hydrogen and p is an integer number from 2 to 5.

It is advisable to perform the reaction for obtaining the catalyst (C) in the presence of an acid (AC) which has a $pK_A$ value of 3 or less, preferably 2 or less, preferably 0 or less, and often −3 or less.

Preferably, the acid (AC) is selected from the group consisting of acids of sulfur oxides and phosphorus oxides, more preferably from the group consisting of sulfuric acid, sulfurous acid, sulfonic acids (such as methane sulfonic acid), phosphorus acid, phosphorous acid and phosphonic acids (such as methane phosphonic acid). Of particular interest are sulfuric acid, sulfurous acid and methane sulfonic acid.

In a particularly preferred embodiment, the reaction by which the catalyst (C) is obtained is carried out in the presence of sulfuric acid.

Preferably, the acid (AC) is used in the reaction thus that the molar ratio of the calcium hydroxide (A) to the acid (AC) is from 5:1 to 1:1, more preferably from 3:1 to 1:1, even more preferably from 2:1 to 1:1.

It is particularly advantageous to prepare the calcium catalyst (C) by first allowing the calcium hydroxide (A) to react with the carboxylic acid (B), preferably in a solvent as described above, after which the reaction mixture is further treated with the acid (AC).

For the reaction by which the calcium catalyst (C) is obtained, any common reactor may be employed, preferably a reactor with an agitating/mixing means, such as, e.g., a magnetic stirrer, a mechanical stirrer, a static mixer, a blender or a batch disperser. Particularly preferably, the mixing of the components is carried out using a batch disperser.

The preparation of the catalyst (C) is preferably carried out under a pressure of from 0.5 to 2 bar, preferably from 0.8 to 1.5 bar, even more preferably from 0.9 to 1.2 bar. In a preferred embodiment, the catalyst is prepared under atmospheric pressure. Furthermore, the catalyst (C) is preferably prepared at a temperature of from −30° C. to 80° C., preferably from −10° C. to 60° C., more preferably from 0° C. to 50° C. In a preferred embodiment, the catalyst is prepared at a temperature of from 20 to 40° C., especially at room temperature.

The thus prepared calcium catalyst (C) typically has a content pf $Ca^{2+}$ ions that is between 0.5 wt-% and 5 wt-%, often from 1 to 4 wt-%, often from 2 to 3 wt-%. Optionally, the catalyst may be rid of volatile components, such as the solvent, water and other volatile byproducts by employing commonly used methods. Preferably, the volatile components are removed in vacuo, e.g. under a pressure below 0.8 bar, preferably below 0.3 bar, more preferably below 0.1 bar, and/or at elevated temperatures, e.g. 50 to 180° C., preferably 70 to 150° C., more preferably 80 to 120° C.

In a particularly preferred embodiment, the volatile compounds are removed on a rotary evaporator at a pressure below 0.1 bar and a temperature of from 80° C. to 120° C.

The ethoxylated glycerol ester Z1) in particular is an ethoxylated glycerol ester of formula (I)

(I)

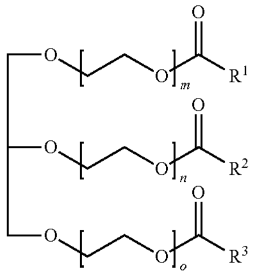

and is prepared from ethylene oxide and one or more triglycerides of formula (II)

(II)

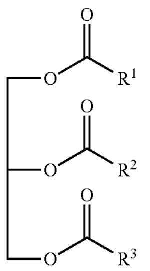

in the presence of the calcium catalyst (C) as defined above.

$R^1$, $R^2$ and $R^3$ in formula (I) of the ethoxylated glycerol ester of the invention and in the one or more triglycerides of formula (II) from which the ethoxylated glycerol ester of the invention is prepared, are equal or different and are independently selected from saturated or unsaturated, linear or branched $C_7$-$C_{24}$ alkyl chains, preferably $C_9$-$C_{20}$ alkyl chains, more preferably $C_{12}$-$C_{18}$ alkyl chains.

m, n and o in formula (I) of the ethoxylated glycerol ester of the invention are each independently an integer number from 1 to 200, preferably 1 to 80, more preferably 2 to 70, with the proviso that the number-average of the sum of m+n+o is greater than 5, preferably from 20 to 70, more preferably from 30 to 60, assessed from the saponification value measured according to DIN EN ISO 3681.

The one or more triglycerides of formula (II) are not particularly limited and may be natural triglycerides or synthetic triglycerides. Preferably the triglycerides do not contain any free hydroxyl groups.

The hydroxyl value of the ethoxylated glycerol ester of the invention, prepared in the presence of the above defined catalyst (C), measured according to DIN EN ISO 4629-2, is typically less than 6 mg KOH/g above the hydroxyl value of the one or more triglycerides of formula (II).

Often, the hydroxyl value of the ethoxylated glycerol ester Z1) is in total below 7 mg KOH/g, preferably below 6 mg KOH/g, more preferably below 5 mg KOH/g. Furthermore, the ratio of $CH_2OH$ groups to alkyl-$CH_3$ groups in the ethoxylated glycerol ester of the invention is typically below 0.15, preferably below 0.12, more preferably below 0.08, even more preferably below 0.06, measured as the ratio of the integrals of corresponding signals in proton-NMR spectra. In a particularly preferred embodiment, the hydroxyl value of the ethoxylated glycerol ester of the invention is below 7 mg KOH/g and the ratio of $CH_2OH$ groups to alkyl-$CH_3$ groups of the ethoxylated glycerol ester of the invention is below 0,12. In a particularly more preferred embodiment, the hydroxyl value is below 5 mg KOH/g and the ratio of $CH_2OH$ groups to alkyl-$CH_3$ groups is below 0,06.

Preferably, the saponification value of the ethoxylated glycerol ester Z1) is below 220 mg KOH/g, more preferably below 150 mg KOH/g, even more preferably above 70 mg KOH/g, measured according to DIN EN ISO 3681.

The one or more ethoxylated glycerol esters Z1) may be used both in conventional rinse aids and in conventional combined products, as well as any other forms of detergent formulations known in the art. The one or more glycerol esters Z1) show their beneficial effects independently of the form or preparation method of the detergent composition for machine dishwashing.

Another benefit of the invention is that the detergent composition for machine dishwashing according to the invention leads to an improved drying capacity of the dishes treated with the composition of the invention.

Furthermore, the one or more ethoxylated glycerol esters Z1) do not increase the foaming rate of detergent compositions, thus that the detergent composition for machine dishwashing according to the invention is weakly foaming.

Moreover, the detergent composition for machine dishwashing according to the invention retains the beneficial rinse aiding properties even in phosphate-free compositions.

Preferably, the detergent composition for machine dishwashing according to the invention comprises the one or more ethoxylated glycerol esters Z1) in amounts of from 0.1 to 15 wt.-%, preferably from 0.5 to 10 wt.-%, more preferably from 1 to 6 wt.-%, based on the total weight of the detergent composition.

The pH value of the detergent composition for machine dishwashing according to the invention is preferably from 8 to 13, more preferably from 9 to 11.5, even more preferably from 9.5 to 11.5 measured at 20° C., as a 10 wt.-% aqueous solution of the detergent composition for machine dishwashing according to the invention.

The detergent composition of the invention (as described above) may further to the one or more ethoxylated glycerol esters Z1) of formula (I) comprise one or more components selected from:

Z2) one or more enzymes,

Z3) one or more builders;

Z4) one or more bleaching agents;

Z5) one or more surfactants;

Z6) one or more polymers

Z7) one or more further additives preferably selected from the group consisting of chelating agents, glass corrosion inhibitors, water, organic solvents, thickeners, foaming inhibitors, color particles, silver protecting agents, agents for preventing the tarnishing of silver, corrosion inhibitors, colorants, fillers, germicidal agents, hydrotropic agents, antioxidants, enzyme stabilizers, perfumes, solubilizers, carriers, processing aids, pigments and pH regulators.

Preferably, the one or more enzymes of component Z2), if present, are selected from the group consisting of proteases, amylases, lipases, hemicellulases, cellulases, perhydrolases and oxidoreductases.

The enzymes are typically of natural origin. Improved variants that are based on natural molecules are obtainable for the use in detergent compositions for machine dishwashing and are accordingly preferred.

Among the proteases, those of the subtilisin type are preferred. Examples are the subtilisins BPN' and Carlsberg, as well as their advanced forms, protease PB92, subtilisins 147 and 309, alkaline protease from Bacillus lentus, subtilisin DY and subtilases.

Examples for amylases applicable according to the invention are α-amylases from *Bacillus licheniformis*, from *B. amyloliquefaciens*, from *B. stearothermophilus*, from *Aspergillus niger* and *A. oryzae* as well as their derivatives improved for use in detergent compositions for machine dishwashing. Furthermore, αAmylase from *Bacillus* sp. A 7-7 (DSM 12368) and the cyclodextrin-glucanotransferase (CGTase) FROM *B. agaradherens* (DSM 9948) are preferred.

Furthermore, lipases or cutinases may be used in the detergent composition of the invention, in particular due to their triglyceride-cleaving activities, but also for in situ preparing peroxy acids from appropriate precursors. Exemplary lipases are those originating from *Humicola lanuginosa* (*Thermomyces lanuginosus*) or their advanced forms, especially those with the amino acid exchange D96L. Exemplary cutinases are those originally isolable from *Fusarium solani pisi* and *Humicola insolens.*

Moreover, enzymes can be used that are pooled under the term hemicellulases. These are, for example, mannanases, xanthanlyases, pektinlyases (=pektinases), pektinesterases, pektatlyases, xyloglucanases (=xylanases), pullulanases and β-glucanases.

For increasing the whitening effect, the detergent composition of the invention may also comprise oxidoreductases, for example oxidases, oxygenases, katalases, peroxidases, such as halo-, chloro-, bromo-, lignin-, glucose oder mangan-peroxidases, dioxygenases or laccases (phenoloxidases, polyphenoloxidases) eingesetzt werden. Advantageously, additional, preferably organic, more preferably aromatic compounds that interact with the enzymes, are added in order to increase the activity of the corresponding oxidoreductases (enhancers) or in order to facilitate the electron transport between the oxidizing enzymes and the contaminations if their redox potentials have a large difference (mediators). The enzymes may be used in any form known in the art, for example as granulated, extruded or lyophilized solid preparations or, particularly in liquid or gel formulations, as solutions of the enzymes, preferably highly concentrated, with a low water content and/or mixed with stabilizers.

Alternatively, the enzymes may be in an encapsulated form, both in solid and in liquid compositions. For example, an enzyme solution may be spray-dried or extruded together with a preferably natural polymer or in the form of capsules, e.g. such, where the enzymes are enclosed in a solidified gel or such of the core-shell type, where an enzyme-containing core is coated with a water-, air- and/or chemical-impermeable protective coating. In additional layers further active agents such as stabilizers, emulsifiers, pigments, whiteners or dyes may be included. Such capsules are prepared by known methods, e.g. shaking granulation or rolling granulation or in fluidized bed processes. Advantageously, such granulates are coated with polymeric film-forming agents and therefore low on dust and storage stable.

Furthermore, it is possible to compound two or more enzymes to prepare granules with multiple enzymatic activities.

The detergent composition for machine dishwashing according to the invention comprises the one or more enzymes Z2) preferably in amounts of from $1\times10^{-6}$ to 5 wt.-%, more preferably from $1\times10^{-5}$ to 3 wt.-%, even more preferably from $1\times10^{-4}$ to 2 wt.-%, based on the total weight of the detergent composition.

This amount relates to active protein. The protein concentration can be determined by known methods such as the BCA-method or the biuret method.

The builders Z3) as well as other ingredients which may be used in detergent composition of the present invention are disclosed, e.g. in US 2010/0160204 and EP-A 1757676.

The builders Z3), if present, may be selected, e.g., from the group consisting of carbonates, bicarbonates, organic builders, preferably methylglycinediacetic acid (MGDA), silicates, phosphates, phosphonates and alkali metal hydroxides.

Preference is given to the use of carbonate(s) and/or bicarbonate(s), preferably alkali metal carbonate(s), more preferably sodium carbonate.

These substances are preferably used in amounts of from 2 to 50 wt.-%, preferably from 10 to 30 wt.-% and in particular from 10 to 25 wt.-%, based on the total weight of the detergent composition according to the invention. Organic builders include polycarboxylates, polycarboxylic acids, polymeric carboxylates, aspartic acid, polyacetals, and dextrins. Useful organic builders are, among others, polycarboxylic acids usable in the form of the free acid and/or their sodium salts, wherein polycarboxylic acids are understood as those carboxylic acids which carry more than one acid moiety. For example these may be citric acid, adipic acid, succinic acid, glutaric acid, malic acid, tartaric acid, maleic acid, fumaric acid, sugar acids, aminocarboxylic acids and nitrilotriacetic acid (NTA) and mixtures thereof. In addition to their builder effect, the free acids typically also have the property of an acidifying agent and thus also serve to set a lower and milder pH for the detergent composition according to the invention. In particular, citric acid, succinic acid, glutaric acid, adipic acid, gluconic acid, tartaric acid and any mixtures thereof are suitable.

Common aminocarboxylic acids that are preferred in the context of the present invention are, for example, ethylenediaminetetraacetic acid (EDTA), methylglycine-diacetic acid (MGDA) and glutamic diacetic acid (GLDA) or mixtures thereof.

Further preferred builders are polymeric aminodicarboxylic acids, their salts or their precursors. Particular preference is given to using polyaspartic acids, their salts or their derivatives.

Particularly advantageous for the cleaning and rinse aiding properties of the detergent composition of the invention is the use of citric acid and/or citrates. Preference is given to detergent compositions which contain citric acid or a salt of citric acid, the weight fraction of citric acid or of the salt of citric acid preferably being from 2 to 50 wt.-%, more preferably from 5 to 30 wt.-% and even more preferably from 10 to 30 wt.-%, based on the total weight of the detergent composition.

In another preferred embodiment of the invention, the automatic dishwashing compositions according to the invention contain MGDA as one of their builders. Machine dishwashing detergents according to the invention preferably contain from 0.5 to 25 wt.-%, more preferably from 2 to 25 wt.-% of MGDA, based on the total weight of the detergent composition.

As organic builders, polymeric carboxylates are also suitable. These are, for example, the alkali metal salts of polyacrylic acid or polymethacrylic acid, for example, those having a molecular weight of 500 to 70,000 g/mol. Suitable polymeric carboxylates are in particular polyacrylates which preferably have a molecular weight of 2,000 to 20,000 g/mol. Because of their superior solubility, the short-chain polyacrylates which have molar masses of from 2000 to 10 000 g/mol and more preferably from 3000 to 5000 g/mol are even more preferred in this group.

Also suitable are copolymeric carboxylates. Suitable comonomers are mono-ethylenically unsaturated dicarboxylic acids such as maleic acid, fumaric acid, maleic anhydride, itaconic acid and citraconic acid. Particularly suitable are copolymeric carboxylates of acrylic acid with methacrylic acid and of acrylic acid or methacrylic acid with maleic acid and/or fumaric acid. Copolymers of acrylic acid with maleic acid which contain 50 to 90 wt.-% of acrylic acid and 10 to 50 wt.-% of maleic acid have proven to be particularly suitable. Their molecular weight relative to free acids is preferably from 2000 to 70,000 g/mol, more preferably from 20,000 to 50,000 g/mol and in particular from 30,000 to 40,000 g/mol. It is also possible to use copolymers of at least one monomer selected from the group consisting of monoethylenically unsaturated $C_3$-$C_{10}$ mono- or $C_4$-$C_{10}$-dicarboxylic acids or their anhydrides, such as maleic acid, maleic anhydride, acrylic acid, methacrylic acid, fumaric acid, itaconic acid and citraconic acid with at least one hydrophilic or hydrophobic modified monomer, as listed below, are used.

Suitable hydrophobic monomers are, for example, isobutene, diisobutene, butane, pentene, hexene and styrene, olefins having 10 or more carbon atoms or mixtures thereof, for example 1-decene, 1-dodecene, 1-tetradecene, 1-hexadecene, 1-octadecene, 1-eicosene, 1-docosene, 1-tetracosene and 1-hexacosene, $C_{22}$-α-olefin, a mixture of $C_{20}$-$C_{24}$-α-olefins and polyisobutene having a number-average of 12 to 100 carbon atoms per molecule.

Suitable hydrophilic monomers are monomers with sulfonate or phosphonate groups and nonionic monomers with hydroxyl function or alkylene oxide groups and optionally other ionogenic or nonionogenic monomers. Examples of the above listed hydrophilic monomers are allyl alcohol, isoprenol, methoxypolyethylene glycol(meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth) acrylate. Polyalkylene glycols may contain 3 to 50, in particular 5 to 40 and especially 10 to 30 alkylene oxide units per molecule.

Particularly preferred monomers containing sulfonic acid groups are 1-acrylamido-1-propanesulfonic acid, 2-acrylamido-2-propanesulfonic acid, 2-acrylamido-2-methylpropanesulfonic acid (2-acryloylamino-2-methylpropane-sulfonic acid), 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy) propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropylmethacrylat, sulfomethacrylamide, sulfomethylmethacrylamide and salts of said acids, such as their sodium, potassium or ammonium salts.

Particularly preferred phosphonate group-containing monomers are vinylphosphonic acid and its salts. Moreover, amphoteric polymers can also be used as builders.

When the detergent composition according to the invention comprises one or more (co)polymeric carboxylates, the amount of these (co)polymeric carboxylates in the automatic dishwashing agent according to the invention is preferably 0.5 to 20 wt.-% by weight and in particular 3 to 10 wt.-%, based on the total weight of the detergent composition of the invention.

Oxidisuccinates and other derivatives of disuccinates, preferably ethylenediamine disuccinate are further preferred organic builders, often referred to as co-builders. Among these, ethylenediamine-N,N'-disuccinate (EDDS) is preferred, especially used in the form of its sodium or magnesium salts. Furthermore as a builder or co-builder preferred in this context are glycerol disuccinates and glycerol trisuccinates.

The detergent composition according to the invention may preferably be builders of crystalline sodium sheet silicates of the general formula $NaMSi_xO_{2x+1}\cdot yH_2O$, wherein M is sodium or hydrogen, x is a number from 1.9 to 22, preferably from 1.9 to 4, more preferably 2, 3 or 4, and y is a number from 0 to 33, preferably from 0 to 20.

The detergent composition according to the invention preferably contains the crystalline sodium sheet silicates of formula $NaMSi_xO_{2x+1}\cdot yH_2O$ in an amount of 0.1 to 20 wt.-%, more preferably from 0.2 to 15 wt.-%, even more preferably from 0.4 to 10 wt.-%, based on the total weight of the detergent composition for machine dishwashing.

It is also possible to use amorphous sodium silicates having a modulus $Na_2O:SiO_2$ of from 1:2 to 1:3.3, preferably from 1:2 to 1:2.8 and in particular from 1:2 to 1:2.6, which preferably show delayed dissolution and secondary wash properties. The dissolution delay compared to conventional amorphous sodium silicates can be caused in different ways, for example by surface treatment, compounding, compaction, condensing or over-drying. In the context of this invention, the term "amorphous" means that the silicates in do not produce sharp X-ray reflections typical of crystalline substances in X-ray diffraction experiments, but at most cause one or more maxima of the scattered X-ray radiation, which have a width of multiple degrees of the diffraction angle.

Alternatively or in combination with the aforementioned amorphous sodium silicates X-ray-amorphous silicates can be used, the silicate particles of which show blurred or even sharp diffraction maxima in Electron diffraction experiments.

This is to be interpreted as meaning that the products have microcrystalline regions of the size of ten to a few hundred nm, with values of up to a maximum of 50 nm and in particular up to a maximum of 20 nm being preferred. Such X-ray amorphous silicates also have a dissolution delay compared to the conventional water glasses. Particularly preferred are condensed/compacted amorphous silicates, compounded amorphous silicates and overdried X-ray-amorphous silicates. In the context of the present invention, it is preferred that these silicates, preferably alkali metal silicates, particularly preferably crystalline or amorphous alkalidisilicates, are present in the detergent composition for machine dishwashing of the invention in amounts of from 3 to 60 wt.-%, preferably from 8 to 50 wt.-% and more preferably from 20 to 40 wt.-%, based on the total weight of the detergent composition.

Phosphates have proven to be effective builders in terms of cleaning performance. Among the large number of commercially available phosphates, the alkali metal phosphates have the greatest importance in the washing and cleaning industry, in particular pentasodium triphosphate or pentapotassium triphosphate (sodium or potassium tripolyphosphate).

Alkali metal phosphates is the summary term for the alkali metal salts (especially sodium and potassium salts) of the various phosphoric acids such as metaphosphoric acids $(HPO_3)_m$, orthophosphoric acid $H_3PO_4$ and higher molecular weight representatives. The phosphates combine several advantages: they act as alkali metal carriers, prevent lime deposits on machine parts and contribute to the cleaning performance of the detergent composition.

Technically particularly important phosphates are the pentasodium triphosphate $Na_5P_3O_{10}$ (sodium tripolyphosphate) and the corresponding potassium salt pentapotassium triphosphate $K_5P_3O_{10}$ (potassium tripolyphosphate). The sodium potassium tripolyphosphates are also preferably used according to the invention. If phosphates are used in the detergent composition according to the invention, preferred agents comprise phosphate(s), preferably alkali metal phosphate(s), more preferably pentasodium or pentapotassiumtriphosphat (sodium or potassium tripolyphosphate), in amounts of from 2 to 50 wt.-%, preferably from 2 to 30 wt.-%, more preferably from 3 to 25 wt.-% and particularly preferably from 3 to 15 wt.-%, based on the total weight of the detergent composition according to the invention.

As further builders, the detergent composition for machine dishwashing according to the invention may contain one or more phosphonates, which are often referred to as co-builders. The amount of phosphonates in the detergent composition of the invention is preferably 0.5 to 20 wt.-% and more preferably 1.0 to 10 wt.-%, based on the total weight of the detergent composition.

The chelating phosphonates include a number of different compounds such as 1-hydroxyethane-1,1-diphosphonic acid (HEDP) or diethylenetriamine penta(methylenephosphonic acid) (DTPMP). Particularly preferred are hydroxyalkane and aminoalkane phosphonates. Among the hydroxyalkane phosphonates, 1-hydroxyethane-1,1-diphosphonate (HEDP) is of particular importance, preferably as a co-builder. It is preferably used as a sodium salt, of which the disodium salt reacts neutral and the tetrasodium salt reacts alkaline (pH 9). As aminoalkanphosphonates, ethylenediamine tetramethylene phosphonate (EDTMP), diethylenetriamine pentamethylenephosphonate (DTPMP) and their higher homologues, among others, are applicable. They are preferably used in the form of neutral reacting sodium salts (e.g. as the hexasodium salt of EDTMP or as hepta- and octasodium salt of DTPMP). From the class of phosphonates, HEDP is preferably used.

Detergent compositions according to the invention can contain, as further builders, alkali metal hydroxides. These alkali carriers are preferably only used in small amounts, typically in amounts of 10 wt.-% or less, preferably 6 wt.-% or less, more preferably 5 wt.-% or less, even more preferably 0.1 to 5 wt. % and in particular 0.5 to 5 wt.-%, based on the total weight of the detergent composition.

In a further preferred embodiment of the invention, the detergent composition according to the invention comprises one or more builders from the group of organic builders. In a particularly preferred embodiment of the invention, the detergent composition contains one or more builders from the group consisting of citrate, methylglycinediacetic acid (MGDA) and ethylenediamine-N,N'-disuccinate (EDDS). In a particularly preferred embodiment of the invention, the automatic dishwasher detergents according to the invention contain MGDA, specifically its trisodium salt.

The detergent composition according to the invention can contain said builders both individually and in the form of mixtures of two, three, four or more builders. In a preferred embodiment of the invention, the detergent composition according to the invention does not contain any phosphate builders.

The detergent composition according to the invention contains the one or more builders of component Z3), preferably in amounts of from 2 to 50 wt.-%, more preferably in amounts of from 10 to 30 wt.-% and especially preferably in amounts of from 10 to 25 wt.-%, based on the total weight of the detergent composition for machine dishwashing according to the invention.

The bleaching agent Z4) of the detergent composition for machine dishwashing according to the invention, if present, preferably contains one or more substances selected from the group consisting of bleaches, bleach activators and bleach catalysts.

As bleach, the detergent composition of the invention may contain an oxygen bleach. Among these oxygen bleaches, which yield $H_2O_2$ in water, sodium percarbonate, sodium perborate tetrahydrate and sodium perborate monohydrate are of particular importance. Further applicable bleaches are, for example, peroxypyrophosphates, citrate perhydrates and $H_2O_2$-yielding peroxy acid salts or peroxy acids, such as peroxy benzoates, peroxy phthalates, diperoxy azelaic acid, Phthaloiminoperoxy acid or diperoxy dodecanedioic acid. Organic bleaches can also be used. Typical organic bleaches are diacyl peroxides, such as dibenzoyl peroxide. Other typical organic bleaches are the peroxy acids, such as alkyl peroxy acids and aryl peroxy acids.

The detergent composition according to the invention preferably comprises one or more bleaches selected from the group consisting of oxygen bleaches, peroxy pyrophosphates, citrate perhydrates, and $H_2O_2$-delivering peroxy acid salts or peroxy acids and organic bleaches. Particularly preferably, the detergent composition contains 1.0 to 20 wt.-%, preferably 4.0 to 18 wt.-% and more preferably 8 to 15 wt.-% of an oxygen bleach, preferably sodium percarbonate, based on the total weight of the detergent composition for machine dishwashing.

To achieve an improved bleaching effect when dishwashing at temperatures of about 60° C. and below, the inventive detergent composition may additionally contain one or more bleach activators. Preferably, the one or more bleach activators are selected from the group consisting of which, under the conditions of perhydrolysis, result in aliphatic peroxycarboxylic acids having preferably 1 to 10 carbon atoms, in particular 2 to 4 carbon atoms, and/or optionally substituted perbenzoic acid. Suitable substances are those which carry O- and/or N-acyl groups with the above-stated number of carbon atoms and/or optionally substituted benzoyl groups. Preference is given to polyacylated alkylenediamines, with tetraacetylethylenediamine (TAED) being particularly suitable.

Bleach activators, in particular TAED, are preferably used in amounts of up to 10 wt.-% by weight, more preferably in amounts of from 0.1 to 8 wt.-% even more preferably in amounts of from 2 to 8 wt.-%, particularly in amounts from 2 to 6 wt.-%, based on the total weight of the detergent composition according to the invention.

In addition to, or in place of, the conventional bleach activators, so-called bleach catalysts can also be used. These substances are bleach-enhancing transition metal salts or transition metal complexes such as Mn, Fe, Co, Ru or Mo-salen complexes or carbonyl complexes. Mn, Fe, Co, Ru, Mo, Ti, V and Cu complexes with nitrogen-containing tripod ligands and Co, Fe, Cu and Ru amine complexes can also be used as bleach catalysts.

It is particularly preferred to use complexes of manganese in the oxidation state II, III, IV or V, which preferably contain one or more macrocyclic ligands with donor functions N, NR, PR, O and/or S. Preferred are ligands having nitrogen donor functions. It is particularly preferred to use bleach catalyst(s) which contain as macromolecular ligands 1,4,7-trimethyl-1,4,7-triazacyclononane (Me-TACN), 1,4,7-triazacyclononane (TACN), 1,5,9-trimethyl-1,5,9-triazacyclododecane (Me-TACD), 2-methyl-1,4,7-trimethyl-1,4,7-triazacyclononane (Me/Me-TACN) and/or 2-methyl-1,4,7-triazacyclononane (Me/TACN). Suitable manganese complexes are, for example, $[Mn^{III}_2(\mu\text{-O})_1(\mu\text{-OAc})_2(TACN)_2](ClO_4)_2$, $[Mn^{III}Mn^{IV}(\mu\text{-O})_2(\mu\text{-OAc})_1(TACN)_2](BPh_4)_2$, $[Mn^{IV}_4(\mu\text{-O})_6(TACN)_4](ClO_4)_4$, $[Mn^{III}_2(\mu\text{-O})_1(\mu\text{-OAc})_2(Me\text{-}TACN)_2](ClO_4)_2$, $[Mn^{III}Mn^{IV}(\mu\text{-O})_1(\mu\text{-OAc})_2(Me\text{-}TACN)_2](ClO_4)_3$, $[Mn^{IV}_2(\mu\text{-O})_3(Me\text{-}TACN)_2](PF_6)_2$ and $[Mn^{IV}_2(\mu\text{-O})_3(Me/Me\text{-}TACN)_2](PF_6)_2(OAc—OC(O)CH_3)$.

In a further preferred embodiment of the invention, the detergent composition according to the invention comprises one or more bleach catalysts from the group of bleach-enhancing transition metal salts and transition metal complexes, preferably from the group of the complexes of manganese with 1,4,7-trimethyl-1,4,7-triazacyclononane (Me-TACN) and 1,2,4,7-tetramethyl-1,4,7-triazacyclononane ($Me_4$-TACN), since the cleaning result can be significantly improved by these bleach catalysts.

Preferably, the bleaching agent Z4) comprises one or more bleaches and one or more substances from the group of bleach activators and bleach catalysts. More preferably, the bleaching agent comprises one or more bleaches, one or more bleach activators, and one or more bleach catalysts.

The detergent composition according to the invention contains the bleaching agent of component Z4) preferably in amounts of 1 to 40 wt.-%, more preferably in amounts of 0.5 to 30 wt.-% and even more preferably in amounts of 3 to 25 wt.-%, based on the total weight of the detergent composition.

The one or more surfactants of component Z5) of the detergent composition according to the invention, if present, are preferably selected from the group consisting of nonionic surfactants, zwitterionic surfactants, anionic surfactants, cationic surfactants and mixtures thereof.

Suitable nonionic surfactants may be any nonionic surfactants known in the art, preferably selected from the group consisting of fatty alcohol alkoxylates, end-capped fatty alcohol alkoxylates, ethylene-oxide/propylene-oxide-block-copolymers, N-acylglucam ides and epoxy-capped poly (alkoxylated) alcohols.

Among these nonionic surfactants of component Z5), preferred surfactants have the general formula (V)

$$R_aO—(—AO—)_x—Y \quad (V),$$

wherein

- $R_a$ is a linear or branched saturated alkyl group of 8 to 30 carbon atoms or a linear or branched unsaturated alkenyl group having one or more double bonds and 8 to 30 carbon atoms,
- A is selected from the group consisting of $—C_2H_4—$ and $—C_3H_6—$,
- X is a number from 1 to 150,
- Y is H, a linear or branched alkyl group of 1 to 30 carbon atoms or a group $—CH(OH)—R_b$, and $R_b$ is a linear or branched alkyl group having 1 to 30 carbon atoms, and wherein the group $—(—AO—)_x—$ comprises one or more $—C_2H_4O$ groups and additionally may comprise one or more $—C_3H_6O$ groups, and, if the group $—(—AO—)_x—$ comprises simultaneously $—C_2H_4O—$ and $—C_3H_6O$ groups, the $—C_2H_4O—$ and $—C_3H_6O$ groups can be distributed in any manner, preferably in statistical, gradient-like or block-like manner, and more preferably in a block-like manner within the $—(—AO—)_x—$ group and the molar amount of $—C_2H_4O$ groups in the group $—(—AO—)_x—$ is preferably greater than the molar amount of $—C_3H_6O$ groups.

Examples for the alkyl- and alkenyl-groups of $R_a$ of formula (V) are, e.g. the alkyl and alkenyl groups of the following alcohols $R_a—OH$: 1-octanol (caprylic alcohol), 2-ethylhexanol, 1-nonanol (pelargonic alcohol), 1-decanol (capric alcohol), 1-undecanol, 1-dodecanol (lauryl alcohol), 1-tridecanol, isotridecanol, 1-tetradecanol (myristyl alcohol), 1-pentadecanol, 1-hexadecanol (cetyl alcohol), cis-9-hexadecene-1-ol (palmitoleyl alcohol), 1-heptadecanol, 1-octadecanol (stearyl alcohol), cetearyl alcohol, 16-methylheptadecan-1-ol (Isostearyl alcohol), 9E-octadecene-1-ol (elaidyl alcohol), cis-9-octadecene-1-ol (oleyl alcohol), oleyl cetyl alcohol (i.e., a mixture of oleyl alcohol and cetyl alcohol), 9Z,12Z-octadecadien-1-ol (linoleyl alcohol), 9E,12E-octadecadien-1-ol (Elaidolinoleyl alcohol), 9Z,12Z,15Z-octadecatrien-1-ol (linolenyl alcohol), 9E,12E,15E-octadecatriene-1-ol (elaidolinolenyl alcohol), 1-nonadecanol, 1-eicosanol (arachidyl alcohol), 1-heneicosanol, 1-docosanol (behenyl alcohol), cis-13-docosen-1-ol (erucyl alcohol), 1-tetracosanol (lignoceryl alcohol), 1-hexacosanol (ceryl alcohol), 1-octacosanol (montanyl alcohol) and 1-triacontanol (myricyl alcohol) or mixtures thereof.

$R_a$ in formula (V) preferably represents a linear or branched saturated alkyl group having 8 to 22 carbon atoms or a linear or branched unsaturated alkenyl group having one or more double bonds and 8 to 22 carbon atoms, more preferably a linear or branched saturated alkyl group having 8 to 18 carbon atoms or a linear or branched unsaturated alkenyl group having one or more double bonds and 8 to 18 carbon atoms, and particularly preferably a linear or branched saturated alkyl group having 12 to 15 carbon atoms or a linear or branched unsaturated alkenyl group having one or more double bonds and 12 to 15 carbon atoms.

Preferably, the groups $R_a$ in formula (V) are alkyl groups.

Preferably, x in formula (V) is a number from 1 to 50, more preferably from 1 to 20, and even more preferably from 5 to 20.

As an example of the alkyl groups Y and $R_b$ of the compounds of the formula (V), the examples given above for the alkyl group $R_a$ of the compound of formula (V) may be mentioned. Further examples are the alkyl groups methyl, ethyl, n-propyl, isopropyl, n-butyl, sec-butyl, isobutyl, tert-butyl, n-pentyl, sec-pentyl (2-pentyl), 3-pentyl, 2-methylbutyl, iso-pentyl (3-methylbutyl), 3-methylbut-2-yl, 2-methylbut-2-yl, neo-pentyl (2,2-dimethylpropyl), 1-hexyl, 2-hexyl, 3 hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2,3-dimethyl-2-butyl, 3,3-dimethyl-2-butyl, 2-ethyl-1-butyl, 1-heptyl, 2-heptyl, 3-heptyl and 4-heptyl.

When Y in the formula (V) represents a linear or branched alkyl group, it is preferably an alkyl group having 1 to 22 carbon atoms.

$R_b$ in formula (V) preferably represents a linear or branched alkyl group having 8 to 22 carbon atoms.

In a preferred embodiment of the invention, the group $—(—AO—)_x—$ consists of one or more $—C_2H_4O$ groups and contains no $—C_3H_6O$ groups.

In a further preferred embodiment of the invention, the group $—(—AO—)_x—$ contains one or more $—C_2H_4O$ groups and one or more $—C_3H_6O$ groups. In this preferred embodiment of the invention, the molar amount of the $—C_3H_6O$ groups, based on the total amount of $—C_2H_4O$ and $C_3H_6O$ groups, is preferably less than 50%, more preferably 45% or less than 45%, even more preferably 40%. or less than 40% and particularly preferably 33% or less than 33%.

In a further preferred embodiment of the invention Y in formula (V) represents H. In this preferred embodiment of the invention, the molar amount of $—C_3H_6O$ groups, based on the total amount of $—C_2H_4O$ and $—C_3H_6O$ groups, is preferably 20 to less than 50%, more preferably 33 to 45%, and even more preferably 33 to 40%.

If Y has a meaning other than H, the molar amount of the $—C_3H_6O$ groups, based on the total amount of $—C_2H_4O$ and $—C_3H_6O$ groups, is preferably 20% or less than 20% and particularly preferably 10% or less than 10%.

In a further preferred embodiment of the invention Y in formula (V) represents an alkyl group having 1 to 4 carbon atoms. In this preferred embodiment, the molar amount of the $—C_3H_6O$ groups, based on the total amount of $—C_2H_4O$ and $—C_3H_6O$ groups, is preferably 20% or less than 20% and particularly preferably 10% or less than 10%.

In a further embodiment of the invention, Y in formula (V) represents the group $—CH(OH)—R_b$, in which $R_b$ is a linear or branched alkyl group having 8 to 22 carbon atoms. In this preferred embodiment, the molar amount of the $—C_3H_6O$ groups, based on the total amount of $—C_2H_4O$ and $—C_3H_6O$ groups, is preferably 20% or less than 20% and particularly preferably 10% or less than 10%.

In a particularly preferred embodiment of the invention, the one or more nonionic surfactants of component Z5) of the detergent composition according to the invention contain a molar average of 8 $—C_2H_4O$ groups and 4 $—C_3H_6O$ groups and $R_a$ represents a linear or branched saturated alkyl group having 12 to 15 carbon atoms or a linear or branched unsaturated alkenyl group having one or more double bonds and 12 to 15 carbon atoms. In these nonionic surfactants of component Z5) of the detergent composition according to the invention Y is preferably H.

The one or more nonionic surfactants of component Z5) of the detergent composition according to the invention preferably has a cloud point of 40 to 60° C.

The detergent composition according to the invention contains the one or more nonionic surfactants of component Z5) preferably in amounts of from 0.1 to 15 wt.-%, more preferably in amounts of from 0.2 to 10 wt.-% and even more preferably in amounts of 0.2 to 5 wt.-%, each based on the total weight of the detergent composition according to the invention.

The variable "x" in the one or more compounds of formula (V) represents molar averages, i.e. the detergent composition according to the invention may contain several compounds of formula (V) with different degrees of alkoxylation.

Preference is also given to detergent compositions according to the invention, where the one or more surfactants of component Z5) are selected from the group of N-acylglucamines, which are also known as N-1-deoxysorbityl fatty acid amides or glucam ides, of the formula (VI), (VI)

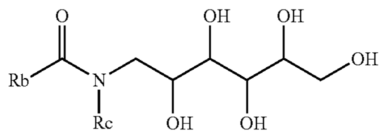

wherein $R_b$ is a linear or branched saturated alkyl group having 11 to 21 Carbon atoms or a linear or branched unsaturated alkenyl group having one or more double bonds and 11 to 21 carbon atoms and Rc is hydrogen or a linear or branched saturated alkyl group having 1 to 4 carbon atoms.

Preferably, in the one or more N-acylglucamines of formula (VI), Rc is a methyl group.

In the one or more N-acylglucamines of the formula (VI), Rb is preferably a linear or branched saturated alkyl group having 11 to 17 carbon atoms or a linear or branched unsaturated alkenyl group with one or more double bonds and 11 to 17 carbon atoms.

More preferably, in the one or more N-acylglucamines of formula (VI) Rb is a linear or branched saturated alkyl group having 15 to 17 carbon atoms or a linear or branched unsaturated alkenyl group having one or more double bonds and 15 to 17 carbon atoms.

In a preferred embodiment of the invention, 50 wt.-% or more, more preferably 60 to 99 wt.-% and even more preferably 70 to 98 wt.-% of the groups Rb in the one or more N-acylglucamines of the formula (VI) are linear or branched saturated alkyl groups with 17 carbon atoms.

In a further preferred embodiment of the invention, 0.1 to 50 wt.-%, more preferably 0.5 to 40 wt.-% and even more preferably 1.0 to 30 wt.-% of the groups Rb in the one or more N-acylglucamines of the formula (VI) are linear or branched saturated alkyl groups with 15 carbon atoms.

In a further preferred embodiment of the invention, 50 wt.-% or more of the Rb groups in the one or more N-acylglucamines of the formula (VI) are linear or branched unsaturated alkenyl groups having one or more double bonds.

In a particularly preferred embodiment of the invention 50 wt.-% or more, more preferably 80 wt.-% or more and even more preferably 90 wt.-% or more of the groups Rb in the one or more N-acylglucamines of the formula (VI) are linear or branched alkenyl groups having one or more double bonds and 17 carbon atoms.

Particularly preferably, in the one or more N-acylglucamines of formula (VI), Rb is a linear group.

In another preferred embodiment of the invention, in the one or more N-acylglucamines of formula (VI) RbCO derives from lauric acid, palmitic acid, stearic acid, oleic acid, linoleic acid or linolenic acid. In a more preferred embodiment of the invention, in the one or more N-acylglucamines of the formula (VI) RbCO derives from stearic acid, oleic acid, linoleic acid or linolenic acid. In an even more preferred embodiment of the invention, in the one or more N-acylglucamines of formula (VI), RbCO derives from oleic acid, linoleic acid or linolenic acid, and in a particularly preferred embodiment of the invention, in the one or more N-acylglucamines of formula (V) RbCO derives from oleic acid.

The detergent compositions according to the invention comprise the one or more surfactants of component Z5), preferably in amounts of from 0.1 to 15 wt.-%, more preferably in amounts of from 0.2 to 10 wt.-% even more preferably in amounts of from 0.2 to 5 wt.-%, based on the total weight of the detergent composition for machine dishwashing according to the invention.

Suitable cationic surfactants of component Z5), which may be used instead of or together with the other surfactants mentioned herein, are, e.g., surfactants of formulae (VII), (VIII) and/or (IX), (VII)

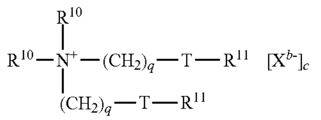

(VIII)

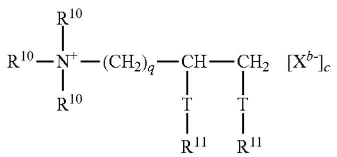

(IX)

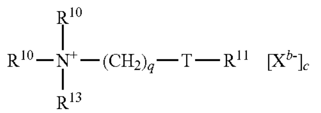

wherein each $R^{10}$ group is independently selected from linear or branched, preferably linear saturated alkyl groups having 1 to 6 carbon atoms, linear or branched, preferably linear, unsaturated alkenyl groups having one or more double bonds and 2 to 6 carbon atoms, and linear or branched, preferably linear hydroxyalkyl groups having 1 to 6 carbon atoms;

each $R^{11}$ group is independently selected from linear or branched saturated alkyl groups having 8 to 28 carbon atoms, linear or branched unsaturated alkenyl groups having one or more double bonds and 8 to 28 carbon atoms;

$R^{12}$ is the same as $R^{10}$ or $(CH_2)_n$-T-$R^{11}$;

$R^{13}$ is the same as $R^{10}$, $R^{11}$ or $(CH_2)_n$-T-$R^{11}$;

T is selected from —$CH_2$—, —O—CO— or —CO—O—;

q is an integer from 0 to 5;

X is an inorganic or organic anion having the charge b−;

b is a number from 1 to 4; and c is a number having a value of 1/b.

Further cationic surfactants suitable as component Z5) of the detergent composition according to the present invention are compounds of formula (X), (X)

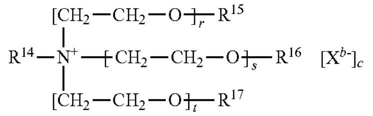

wherein $R^{14}$ is a linear or branched, preferably linear saturated alkyl group having from 1 to 6 carbon atoms;

$R^{15}$, $R^{16}$ and $R^{17}$ are equal or different and are independently selected from the group consisting of hydrogen, linear or branched saturated alkyl groups having from 1 to 18 carbon atoms, linear or branched unsaturated alkenyl groups having one or more double bonds and from 2 to 18 carbon atoms, and —CO—$R^{18}$;

$R^{18}$ is a linear or branched saturated alkyl group having 7 to 19 carbon atoms or a linear or branched unsaturated alkenyl group having one or more double bonds and 7 to 19 carbon atoms;

r, s and t are equal or different and are independently a number from 0 to 50;

X is an inorganic or organic anion having the charge b−;

b is a number from 1 to 4; and c is a number having a value of 1/b;

with the proviso that at least one group of $R^{15}$, $R^{16}$ and $R^{17}$ is —CO—$R^{18}$ which forms an ester moiety with the oxygen atom of an ethoxy group;

the sum of r+s+t is a number from 1 to 70; and if one or more of r, s and/or t is 0, the corresponding group $R^{15}$, $R^{16}$ and/or $R^{17}$ is a linear or branched saturated alkyl group having 1 to 18 carbon atoms or a linear or branched unsaturated alkenyl group having 2 to 18 carbon atoms.

Preferable zwitterionic surfactants applicable as component Z5) are selected from the group consisting of $C_8$ to $C_{18}$, preferably $C_{12}$ to $C_{18}$ amine oxides and sulfo- and hydroxyl betaines, such as N-alkyl-N,N-dimethylamino-1-propanesulfonate, wherein the alkyl group may be $C_9$ to $C_{18}$, preferably $C_{10}$ to $C_{14}$.

Preferable anionic surfactants applicable as component Z5) are selected from alkyl ethoxysulfates having a degree of ethoxylation of more than 3, more preferably 4 to 10 and even more preferably 6 to 8 and an alkyl chain length in the range of $C_8$ to $C_{16}$ and preferably $C_{11}$ to $C_{15}$. In addition, branched alkyl carboxylates have been found to be useful for the purposes of the present invention when the branching occurs in the middle and the average total chain length is 10 to 18, preferably 12 to 16 with a side chain length of 2 to 4 carbon atoms. An example of this is 2-butyloctanoic acid. The anionic surfactant is usually of a type having good solubility in the presence of calcium. Furthermore, alkyl (polyethoxy) sulfates (AES), alkylbenzene sulfonates and short-chain $C_6$-$C_{10}$-alkyl sulfates and sulfonates are among such anionic surfactants. It has been revealed that straight-chain fatty acids are ineffective because of their sensitivity to calcium.

In preferred embodiments, the detergent composition for machine dishwashing according to the present invention comprises cationic and/or zwitterionic surfactants in component Z5) in amounts smaller than 6 wt.-%, preferably smaller than 4 wt.-%, more preferably smaller than 2 wt.-%, even more preferably smaller than 1 wt.-%.

Suitable polymers of component Z6) include washing or cleaning-active polymers, for example rinse aid polymers and/or polymers which act as softeners. In general the detergent composition for machine dishwashing according to the present invention may include, as polymers of component Z6), nonionic, cationic, anionic and/or amphoteric polymers.

Cationic polymers in the context of the present invention are polymers which carry a positive charge in the polymer molecule. This can be realized, for example, by (alkyl) ammonium groups or other positively charged groups present in the polymer chain. Particularly preferred cationic polymers come from the groups of quaternized cellulose derivatives, polysiloxanes with quaternary groups, cationic guar derivatives, polymeric dimethyldiallylammonium salts and their copolymers with esters and amides of acrylic acid and methacrylic acid, copolymers of vinylpyrrolidone with quaternized derivatives of dialkylaminoacrylates and methacrylates, vinylpyrrolidone-methoimidazolinium chloride copolymers, quaternized polyvinyl alcohols, or polymers having the INCI names polyquaternium 2, polyquaternium 17, polyquaternium 18 and polyquaternium 27.

If cationic polymers are used in component Z6), they are particularly preferably copolymers comprising polyalkylene oxide groups and quaternary nitrogen atoms. More preferably the cationic polymers of component Z6) are copolymers comprising 0.1 to 99.9 mol-%, preferably 20.0 to 80.0 mol-%, more preferably 22.0 to 77.6 mol-% of one or more cationic structural units (D); and 0.1 to 99.9 mol-%, preferably 0.4 to 20.0 mol-%, more preferably 0.5 to 4.4 mol-% of one or more macromonomeric structural units (E), wherein the one or more cationic structural units (D) are represented by the following general formulae (XI) and/or (XII):

(XI)

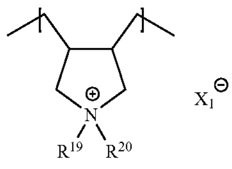

(XII)

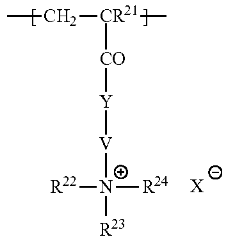

wherein $R^{19}$ and $R^{21}$ are equal or different and are independently selected from hydrogen and/or a methyl group;

$R^{20}$, $R^{22}$, $R^{23}$ and $R^{24}$ are equal or different and are independently selected from the group consisting of hydrogen, an aliphatic hydrocarbon residue having 1 to 20, preferably 1 to 4 carbon atoms, a cycloaliphatic hydrocarbon residue having 5 to 20, preferably 5 to 8 carbon atoms, an aryl group having 6 to 14 carbon atoms and/or polyethylene glycol (PEG), and preferably are equal or different and independently selected from the group consisting of hydrogen and/or methyl, and particularly preferably are methyl;

Y is the same or different and is selected from oxygen, NH and/or $NR^{22}$,

V is the same or different and is selected from $-(CH_2)_x-$,

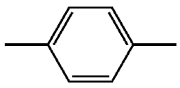 and/or 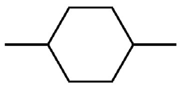 , x is the same or different and is a number from 1 to 6;

X and $X_1$ are equal or different and are independently selected from a halogen atom, $C_1$ to $C_4$-alkylsulfate and/or $C_1$ to $C_4$ alkylsulfonate; and the one or more macromonomeric structural units (E) are represented by the following general formula (XIII):

(XIII)

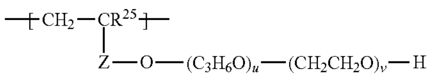

wherein $R^{25}$ is the same or different and is H and/or methyl;

Z is the same or different and is C═O and/or $O(CH_2)_4$, preferably $O(CH_2)_4$, u is, on molar average, a number from 0 to 7, preferably from 0 to 6; and v is, on molar average, a number from 1 to 150, preferably from 11 to 150, more preferably from 12 to 150.

Amphoteric polymers in the context of the present invention have, alongside positively charged groups, also negatively charged groups or monomeric units in the polymer chain. These negatively charged groups or monomeric units may be derived, e.g. from carboxylic acids, sulfonic acids of phosphonic acids.

Preferable amphoteric polymers applicable in component Z6) of the detergent composition of the invention are selected from the group consisting of alkylacrylamide/acrylic acid-copolymers, alkylacrylamide/methacrylic acid copolymers, alkylacrylamide/methylmethacrylic acid copolymers, alkylacrylamide/acrylic acid/alkyl aminoalkyl (meth)acrylic acid copolymers, alkylacrylamide/methacrylic acid/alkylaminoalkyl(meth)acrylic acid copolymers, alkylacrylamide/methylmethacrylic acid/alkylaminoalkyl (meth)acrylic acid copolymers, alkylacrylamide/alkylmethacrylate/alkylaminoethylmethacrylate/alkylmethacrylate copolymers, and copolymers of unsaturated carboxylic acids, cationically derivatized unsaturated carboxylic acids and optionally further ionic or not-ionogenic monomers. Further preferably applicable amphoteric polymers are selected from the group consisting of acrylamidoalkyltrialkylammonium chloride/acrylic acid copolymers and their alkaline metal or ammonium salts, acrylamidoalkyltrialkylammonium chloride/methacrylic acid copolymers and their alkaline metal or ammonium salts, and methacroylethylmetaine/methacrylate copolymers.

If the detergent composition for machine dishwashing according to the invention contains cationic and/or amphoteric polymers in component Z6), these polymers are preferably present in amounts of from 0.01 to 10 wt.-%, based on the total weight of the detergent composition. In the context of the present invention, preference is given to those detergent compositions, in which the weight fraction of the cationic and/or amphoteric polymers is from 0.01 to 8 wt.-%, preferably 0.01 to 4 wt.-%, more preferably from 0.01 to 2 wt.-%, even more preferably 0.01 to 1 wt.-%, based on the total weight of the detergent composition.

Another group of preferably applicable polymers applicable in component Z6) of the detergent composition for machine dishwashing of the invention are alkoxylated polyalkyleneimines. Alkoxylated polyalkyleneimines have a polyalkyleneimine backbone and alkoxy chains. Preferably, the polyalkyleneimine is polyethyleneimine. More preferably, the alkoxylated polyalkyleneimine is not quaternized.

If the detergent composition comprises alkoxylated polyalkyleneimines in component Z6), the composition preferably comprises from 1% to 10 wt.-%, more preferably from 1% to 8 wt.-% of alkoxylated polyalkyleneimines, based on the total weight of the detergent composition.

Preferably, the alkoxylated polyalkyleneimine used in component Z6) comprises 0.5 to 40 wt.-%, more preferably 1 to 30 wt.-%, even more preferably 2 to 20 wt.-% of the polyalkyleneimine backbone and 60 to 99 wt.-%, more preferably 60 to 95 wt.-%, even more preferably from 60 to 90 wt.-% of the alkoxy chains.

Preferably, the alkoxy chains have an average of from about 1 to about 50, more preferably from about 2 to about 40, even more preferably from about 3 to about 30 and particularly preferably from about 3 to about 20 especially from about 4 to about 15 alkoxy units, which are preferably ethoxy units. In other suitable alkoxylated polyalkyleneimines for use in component Z6), the alkoxy chains have an average of from about 0 to 30, more preferably from about 1 to about 12, even more preferably from about 1 to about 10 and particularly preferably from about 1 to about 8 propoxy units. Especially preferred are alkoxylated polyethyleneimines wherein the alkoxy chains comprise a combination of ethoxy and propoxy chains, in particular polyethyleneimines comprising chains of from 4 to 20 ethoxy units and from 0 to 6 propoxy units.

Preferably, the alkoxylated polyalkyleneimine is obtained from alkoxylation wherein the starting polyalkyleneimine has a weight-average molecular weight of from about 100 to about 60,000, preferably from about 200 to about 40,000, more preferably from about 300 to about 10,000 g/mol. In a preferred embodiment, a polyethyleneimine with a weight average molecular weight of 600 g/mol ethoxylated with 20 EO groups per NH group is used as the alkoxylated polyalkyleneimine.

Other suitable polyalkyleneimines for applicable in component Z6 of the detergent composition of the invention include compounds having the following general structure: $bis((C_2H_5O)(C_2H_4O)_n)(CH_3)-N^+-C_xH_{2x}-N^+-(CH_3)-bis((C_2H_5O)(C_2H_{40})_n)$, wherein n is a number from 20 to 30, and x is a number from 3 to 8, or sulfated or sulfonated variants thereof.

The one or more further additives Z7) are preferably selected from the group consisting of chelating agents, glass corrosion inhibitors, water, organic solvents, thickeners, foaming inhibitors, color particles, silver protecting agents, agents for preventing the tarnishing of silver, corrosion inhibitors, colorants, fillers, germicidal agents, hydrotropic agents, antioxidants, enzyme stabilizers, perfumes, solubilizers, carriers, processing aids, pigments and pH regulators.

Glass corrosion inhibitors prevent the occurrence of haze, streaks and scratches, but also iridescence of the glass surface of machine-cleaned glasses. Preferred glass corrosion inhibitors are, among others, magnesium, cobalt and zinc salts and magnesium, cobalt and zinc complexes.

Proteins and/or enzymes, such as those in Z2), may be particularly sensitive to damage such as inactivation, denaturation or degradation during storage (e.g. by physical influences, oxidation or proteolytic cleavage). In the case of microbial recovery of the proteins and/or enzymes, inhibition of the proteolysis is particularly preferred, in particular if the automatic dishwasher detergents according to the invention also contain proteases. Therefore, the detergent composition for machine dishwashing according to the invention may contain enzyme stabilizers. The provision of such agents in the detergent composition constitutes a particularly preferred embodiment of the invention.

Preferably, such detergent compositions contain 0.1 to 12 wt.-%, more preferably 0.2 to 10 wt.-%, even more preferably 0.5 to 8 wt.-%, based on the total weight of the detergent composition, of such enzyme stabilizers.

The cleaning performance of the detergent composition according to the invention can be improved by the addition of organic solvents. A preferred embodiment of the present invention is therefore an detergent composition according to the invention which contains at least one organic solvent. Preferred liquid machine dishwashing detergent compositions according to the invention contain organic solvent in amounts of from 0.2 to 15 wt.-%, more preferably in amounts of from 0.5 to 12 wt.-% and even more preferably in amounts of from 1.0 to 10 wt.-%, based on the total weight of the detergent composition.

These organic solvents are for example monoalcohols, diols, triols, polyols, ethers, esters and/or amides. Particular preference is given to organic solvents which are water-soluble, "water-soluble" solvents in the sense of the present application are solvents which are completely miscible with water at room temperature (i.e., without miscibility gaps). The organic solvents from the group of organic amines and/or alkanolamines are effective in terms of cleaning performance and in particular with regard to the cleaning performance of bleachable soiling, especially on tea stains.

In order to achieve the desired viscosity of a liquid detergent composition according to the invention, thickeners can be added to this composition. In the detergent composition for machine dishwashing according to the invention, the thickeners commonly used in detergent compositions for machine dishwashing can be used.

Advantageously, liquid detergent compositions of the invention contain one or more thickeners in amounts preferably from 0.1 to 8 wt.-%, more preferably from 0.2 to 6 wt.-% and even more preferably from 0.4 to 4 wt.-%, based on the total weight of the liquid detergent composition according to the invention.

Foaming inhibitors, color particles, silver protecting agents, agents for preventing the tarnishing of silver, corrosion inhibitors, colorants, fillers, germicidal agents, hydrotropic agents, antioxidants, enzyme stabilizers, perfumes, solubilizers, carriers, processing aids, pigments and pH regulators may be selected from the corresponding substances commonly used in detergent compositions for machine dishwashing.

Particularly preferably, the detergent composition for machine dishwashing according to the invention comprises Z1) 0.1 to 15 wt.-% of component Z1), Z2) $1\times10^{-6}$ to 5 wt.-% of component Z2), Z3) 2 to 50 wt.-% of component Z3), Z4) 1 to 40 wt.-% of component Z4), Z5) 0 to 15 wt.-% of component Z5), Z6) 0 to 10 wt % of component Z6). and Z7) 0 to 70 wt.-% of component Z7), based on the total weight of the detergent composition.

In a further preferred embodiment, the detergent composition according to the invention contains no phosphate-based builders, and more preferably the detergent compositions according to the invention contains no phosphates, i.e. they are phosphate-free.

The detergent composition for machine dishwashing according to the invention can be prepared in solid or liquid form and as a combination of solid and liquid forms.

Preference is given to detergent compositions according to the invention, which are solid at 20° C. Powder, granules, extrudates or compactates, in particular tablets in single-phase or multiphase form are particularly suitable as solid forms. Tablets are formulated for single-dose applications. The solid compositions according to the invention preferably contain less than 20 wt.-% of water, more preferably 0.1 to 20 wt.-% of water and even more preferably 0.5 to 5 wt.-%, based on the total weight of the detergent composition according to the invention. In another preferred embodiment of the invention, the detergent composition for machine dishwashing is anhydrous.

In a particularly preferred embodiment of the invention, the solid detergent composition for machine dishwashing is in the form of a tablet.

Preference is also given to detergent compositions for machine dishwashing according to the invention, which comprise one or more compounds of formula (I) and are enclosed in a water-soluble foil, preferably a polyvinyl alcohol containing foil.

In the context of the present invention, the term "water soluble foil" means that the foil comprises a water-soluble polymer, copolymer or mixtures thereof in a weight fraction of at least 90 wt.-%, based on the weight of the foil. Water soluble polymers in the context of the present invention are polymers which are soluble in water at 25° C. to an amount of more than 2.5 wt.-%, based on the amount of water.

Preferable materials of the water soluble foil are at least partially composed of a substance selected from the group consisting of polyvinyl alcohols, acetalized polyvinyl alcohols, polyvinylpyrrolidones, gelatine, polyvinyl alcohols substituted with sulfate, carbonate and/or citrate, polyalkylene oxides such as polyethylene oxides, acrylamides, cellulose esters, cellulose ethers, celullose amides, cellulose, polyvinyl acetate, polycarboxylic acids and their salts, polyaminoacids or peptides, copolymers of acrylamides and (meth)acrylic acid, polysaccharides such as starch or guar derivatives, and compounds with the INCI names polyquaternium 2, polyquaternium 17, polyquaternium 18 and polyquaternium 27. In a particularly preferred embodiment, the material of the water soluble foil comprises polyvinyl alcohol.

In a further preferred embodiment of the invention, the material of the water soluble foil comprises mixtures of different substances, such as copolymers. Such mixtures enable the adjustment of the mechanical properties of the foil and the container formed thereof, and may affect the degree of water solubility. Preferably, the water soluble foil contains at least one polyvinyl alcohol and/or at least one polyvinyl alcohol copolymer.

In a further preferred embodiment, the detergent composition of the invention is liquid at 20° C. The liquid formulation, preferably based on water and/or organic solvents, can be provided in a thickened form, as a gel. Capsules (caps) are particularly suited for liquid formulations in single-phase or multiphase form. Preferably, the liquid detergent composition for machine dishwashing according to the invention contain up to 60 wt.-% of water, more preferably from 10 to 60 wt.-% of water, even more preferably 25 to 60 wt.-% of water, based on the total weight of the liquid detergent composition for machine dishwashing according to the invention.

In a particularly preferred embodiment, the detergent composition for machine dishwashing according to the invention is provided in the form of a powder, a gel, a pod, a cap or as a liquid rinse aid.

The detergent composition for machine dishwashing according to the invention is advantageously suitable for cleaning dishes in dishwashers, dirty dishes being treated in a dishwashing machine with an aqueous alkaline composition containing the detergent composition according to the invention, or alternatively with an aqueous composition at a pH ranging from 5.5 to 8.5 comprising the detergent composition of the invention.

A further aspect of the invention is therefore a method of cleaning dishes in a dishwashing machine, in which contaminated dishes are treated in the dishwashing machine with an aqueous composition at a pH ranging from 5.5 to 8.5, preferably 6 to 8, more preferably 6.5 to 7.5, comprising a detergent composition according to the invention.

Another further aspect of the invention is a method of cleaning dishes in a dishwashing machine, wherein contaminated dishes are treated in the dishwashing machine with an aqueous alkaline composition comprising the detergent composition for machine dishwashing according to the invention.

In this method of cleaning dishes, the pH of the aqueous alkaline solution is preferably 8 or above, more preferably 9 or above. In a particularly preferred embodiment, the pH of the aqueous alkaline solution is from 8 to 13. In a particularly more preferred embodiment, the pH of the aqueous alkaline solution is from 9 to 12.

The preferred embodiments described above for the detergent composition for machine dishwashing according to the invention also apply correspondingly to the process according to the invention for cleaning dishes in a dishwasher and to the use according to the invention of the detergent composition according to the invention or of the one or more ethoxylated glycerol esters of component Z1) of the detergent composition according to the invention as rinse aids in automatic dishwashing, for the improvement of the wettability of dishes, the reduction of stain and film formation on the dishes, the machine compartment and/or the filter of the machine during machinated dishwashing, and the use of the ethoxylated glycerol ester Z1) for improving the rinse aiding properties and/or the drying capacity of a machine dishwashing detergent composition.

The invention is explained in more detail below by the examples and the claims. Unless explicitly stated otherwise in the examples, the percentages in the examples are to be understood as percent by weight (wt.-%).

EXAMPLES

Synthesis Example 1

Methods of Preparation of Calcium Catalyst (C) with Carboxylic Acid of Formula (III)

a) A mixture of 1047.0 g of a carboxylic acid of formula (III) under the trade name "Emulsogen COL 050" marketed by Clariant Produkte (Deutschland) GmbH, 55.8 g of Calcium hydroxide and 360.6 g of propan-2-ol was agitated at ambient temperature for 5 min with a batch disperser (Ultra Turrax from IKA Werke GmbH & Co KG). After this, 44.2 g of concentrated sulfuric acid were added over two minutes and the mixture was again agitated for 5 min with the batch disperser, providing a catalyst with a $Ca^{2+}$ content of 2.00 wt-% (henceforth "(C-1)").

Similar results for providing the catalyst with a $Ca^{2+}$ content of approximately 2.00 wt-% can be obtained by using methane-sulfonic acid or sulfurous acid instead of sulfuric acid.

b) A mixture of 1047.0 g of a carboxylic acid of formula (III) under the trade name "Emulsogen COL 050" marketed by Clariant Produkte (Deutschland) GmbH, 55.8 g of Calcium hydroxide and 360.6 g of propan-2-ol was agitated at ambient temperature for 5 min with a batch disperser (Ultra Turrax from IKA Werke GmbH & Co KG). After this, 42.9 g of methanesulfonic acid (99 wt.-%) were added over two minutes and the mixture was again agitated for 5 min with the batch disperser, providing a catalyst with a $Ca^{2+}$ content of 2.00 wt-% ("(C-3)").

c) A mixture of 1047.0 g of a carboxylic acid of formula (III) under the trade name "Emulsogen COL 050" marketed by Clariant Produkte (Deutschland) GmbH, 55.8 g of Calcium hydroxide and 360.6 g of propan-2-ol was agitated at ambient temperature for 5 min with a batch disperser (Ultra Turrax from IKA Werke GmbH & Co KG). After this, 603.7 g of sulfurous acid (6 wt.-%) were added over two minutes and the mixture was again agitated for 5 min with the batch disperser. The solvent mixture was removed under vacuum, providing a catalyst with a $Ca^{2+}$ content of approx. 2 wt-% ("(C-4)").

Emulsogen COL 050 is a commercial product carboxylic acid (B) comprising, as main component, a carboxylic acid represented by formula (III) wherein $R^4$ is oleyl; $R^5$, $R^6$, $R^7$ and $R^8$ are hydrogen; and p is 5.

Synthesis Example 2

Synthesis of Ethoxylated Coconut Oil (45 EO)

The coconut oil (1 molar equivalent) and the catalyst (C-1) (0.8% by weight, based on the total weight of the mixture of coconut oil and ethylene oxide), were placed into a glass autoclave, which was then flushed with nitrogen by alternatingly applying vacuum and introducing nitrogen (3 cycles). The mixture was dried under aspirator vacuum at 100° C. for 1 hour. The pressure in the autoclave was restored to ambient with nitrogen and heated to 175° C. At this temperature the autoclave was pressurized with nitrogen to a pressure of 0.8 bar above atmospheric pressure, after which pressure controlled dosage of ethylene oxide (45 molar equivalents) took place up to a maximum pressure of 4.5 bar above atmospheric pressure.

The ethoxylation is carried out in a semi-batch process with automated dosage of ethylene oxide within a given temperature window and up to the specified maximum pressure. The pressure is adjusted according to the increased filling volume of the vessel. After introduction of the intended amount of ethylene oxide and closing the ethylene oxide inlet, the reaction was continued until the pressure became constant. The reactor content was cooled to 90° C. and aspirator vacuum was applied for 30 min in order to remove residual ethylene oxide. The temperature was reduced to 80° C. and the final product was transferred into storage vessels and analyzed. The typical batch scale was 400 g to 2000 g. The uptake of the intended amount of ethylene oxide is assured by gravimetry and by determination of the saponification value according to DIN EN ISO 3681.

Comparative Synthesis Example (Glycerol+45 EO+Coconut Fatty Acid)

Glycerol (1 molar equivalent) and an aqueous potassium hydroxide solution of 40 wt.-% (0.4% by weight, based on the total weight of the mixture of Glycerol and ethylene oxide), were placed into a glass autoclave, which was then flushed with nitrogen by alternatingly applying vacuum and introducing nitrogen (3 cycles). The mixture was dried under aspirator vacuum at 100° C. for 1 hour. The pressure in the autoclave was restored to ambient with nitrogen and heated to 160° C. At this temperature the autoclave was pressurized with nitrogen to a pressure of 0.8 bar above atmospheric pressure, after which pressure-controlled dosage of ethylene oxide (45 molar equivalents) took place up to a maximum pressure of 5 bar above atmospheric pressure according to standard alkoxylation procedure.

After introduction of the intended amount of ethylene oxide, the reactor content was cooled to 90° C. and aspirator vacuum was applied for 30 min in order to remove residual ethylene oxide. The temperature was reduced to 80° C. and the product was isolated.

In a subsequent reaction step, the Glycerol ethoxylate (1 eq.) was esterified with coconut fatty acid (3 eq.) using a Dean-Stark-Apparatus and 1.0 wt.-% of sulfuric acid (calculated on the total reaction mass) as a catalyst. The reaction was carried out at 170° C. for 8 h, until the calculated amount of water was distilled off and the residual acid value of the product was below 10 mgKOH/g.

Example 1: Drying Capacity and Clean Dishwasher Interior

The drying capacity of the detergent composition for machine dishwashing F2 according to the invention was investigated. As a comparative example, the drying capacity of the comparative formulations F1 and F3 were tested.

Testing Conditions:

| | |
|---|---|
| Dishwashing machine: | Miele G 1222 SC GSL-2 |
| Testware dishes: | 10 appetizer spoons<br>10 appetizer forks<br>10 teaspoons<br>2 vegetable serving spoons<br>12 drinking glasses<br>10 porcelain cups<br>25 porcelain plates |

-continued

| | |
|---|---|
| | 3 SAN (poly-styrene-co-acrylonitrile) plates<br>3 PP (polypropylene) plates<br>6 PP bowls |
| Dishwashing program: | P4R0 without pre-rinsing<br>main rinse at 50° C.<br>final rinse at 65° C. |
| Water hardness: | 21° dH |
| Wasser softening: | none |
| Detergent dosage: | 18 g, added into the detergent tablet tray immediately after opening of the dosing chamber |
| Contamination: | 50 g frozen dirt, added immediately after opening of the dosing chamber |
| Rinse aid: | none |
| Cleaning cycles: | 4 |

All items were treated once with demineralized water, Neodisher A 8, citric acid, and demineralized water.

Evaluation:

Evaluation of the testware was begun 30 minutes after the dishwashing cycle was completed. During this time, the dishwasher door was closed. For each test, dishwashing cycles 2 to 4 were evaluated. The assessment was carried out in each case with an illumination of 1000-1500 lux.

In a fixed order and with a set time limit, the number of adherent drops of residual water was counted for each testware item. Depending on the counted number of drops, the following rating of the drying capacity results for each testware item:

Rating for Porcelain, Stainless Steel and Glass:

| | |
|---|---|
| 0 | dry, no water drops |
| 1 | 1 water drop |
| 2 | 2 water drops |
| 3 | 3 water drops |
| 4 | 4 water drops |
| 5 | 5 water drops |
| 6 | more than 5 water drops |

Rating for Plastics:

| | |
|---|---|
| 0 | dry, no water drops |
| 1 | 1 water drop |
| 2 | 2 water drops |
| 3 | 3 water drops |
| 4 | 4 water drops |
| 5 | 5 water drops |
| 6 | 6 water drops |
| 7 | 7 water drops |
| 8 | more than 7 water drops. |

In this rating scheme, there is a score of 0 for best performance and a score of 6 for worst performance for each testware dish. For each dishwashing cycle 2, 3 and 4, the sum of the scores of all test dishes was formed. For comparison of the formulations F1, F2 and F3, the average grade of all sums of the dishwashing cycles 2 to 4 was averaged in each case. This leads to a theoretical maximum value with the worst drying performance of 630 and a theoretical minimum value with the best drying performance of 0.

The results are shown in the following table A.

Furthermore, the fatty residues on plastic parts (filter, rinse aid chamber) of the dishwashing machine were evaluated (on a scale of 1 to 7, with 1 representing a large amount of residues and 7 representing no residues). These results are also shown in table A.

Compositions:

The compositions of the formulations F1, F2 and F3 are shown in the following Table A.

Example 2: Rinse Aiding Performance of Detergent Compositions for Machine Dishwashing The rinse aiding performance of the formulation F2 according to the invention was investigated. As comparative examples, the rinse aiding performance of the comparative formulations F1 and F3 was tested.

Testing Conditions:

| | |
|---|---|
| Dishwashing machine: | Miele G 1222 SC GSL |
| Testware dishes: | 6 drinking glasses (higher quality) |
| (8 material groups) | 6 drinking glasses (lower quality) |
| | 3 PP bowls |
| | 3 melamine plates |
| | 3 butter dishes + 4 knives (stainless steel; lower quality) |
| | 4 knives (stainless steel; higher quality) |
| | 3 porcelain plates (higher quality) |
| | 3 porcelain plates (lower quality) |
| Dishwashing program: | program 4, R = 2 without pre-rinsing main rinse at 50° C. final rinse at 65° C. |
| Water hardness: | 21° dH |
| Water softening: | none |
| Detergent dosage: | 18 g, added to the dosage chamber before starting the test |
| Contamination: | 100 g frozen dirt, added immediately after the opening of the dosage chamber |
| Rinse aid: | none |
| Cleaning cycles: | 4 |

All testware dishes except for the PP bowls were treated once with demineralized water, Neodisher A 8, citric acid and again demineralized water.

Evaluation:

Evaluation of the testware was begun at least 60 minutes after opening the door of the dishwashing machine after completion of the dishwashing cycle. For each test, dishwashing cycles 2 to 4 were evaluated. The assessment was carried out according to the following rating:

Rinse Aid Effects Considered for the Visual Rating:

| | |
|---|---|
| Stains | Stains of different size and intensity |
| Contact spots | Stains resultant from contact points between the testware dishes and parts of the dishwashing machine |
| Stripes | Rinse aid stripes |
| Film formation | continuous film spread uniformly on the testware dishes |
| Structured film formation | Dispersed torn film |
| Solid residues | Solid powder or crystalline residues |
| Fatty resudues | Fatty drops or fatty film formation |
| Iridescence | Shimmering, iridescence |

Visual Rating Marks:

| | |
|---|---|
| 10 | Perfect |
| 9 | Perfect to barely visible |
| 8 | Barely visible |
| 7 | Barely visible to visible |

-continued

| | |
|---|---|
| 6 | Visible |
| 5 | Visible to disturbing |
| 4 | Disturbing |
| 3 | Disturbing to unacceptable |
| 2 | Unacceptable |
| 1 | Absolutely unacceptable |

The combination of the above listed eight rinse aid effects leads to a rating from 1 to 10 according to the above visual rating marks, wherein a rating of 1 represents the worst performance and a rating of 10 represents the best performance. For each of the above 8 testware material groups in each dishwashing cycle, an average rating was determined, followed by calculating the sum of ratings for all material groups in each individual dishwashing cycle, followed by determining an average rating for the entirety of dishwashing cycles 2 to 4. The resultant average rating was used as the final rinse aiding performance of the formulations F1, F2 and F3. This leads to a theoretical maximum value of 80 for the best performance and a theoretical minimum value of 8 for the worst performance.

Compositions:

The compositions of the formulation F2 according to the invention and of F1 and F3 are shown in the following table A. The results are also shown in table A.

TABLE A

Compositions, drying capacity, fatty residues and rinse aiding performance of formulations F1, F2, and F3

| Component | F1 wt.-% | F2 wt.-%*) | F3 wt.-% |
|---|---|---|---|
| trisodium citrate dihydrate | 28.5 | 28.5 | 28.5 |
| sodium carbonate | 19.5 | 19.5 | 19.5 |
| sodium silicate | 2.0 | 2.0 | 2.0 |
| MGDA-$Na_3$ | 15.0 | 15.0 | 15.0 |
| polycarboxylate | 10.0 | 10.0 | 10.0 |
| sodium percarbonate | 9.0 | 9.0 | 9.0 |
| TAED | 2.0 | 2.0 | 2.0 |
| HEDP | 0.9 | 0.9 | 0.9 |
| protease | 0.9 | 0.9 | 0.9 |
| amylase | 0.9 | 0.9 | 0.9 |
| modified fatty alcohol ethoxylate | 3.5 | — | — |
| Coconut oil + 45 EO | — | 3.5 | — |
| Glycerol + 45 EO + coconut fatty acid | | | 3.5 |
| sodium sulfate | 3.2**) | 3.2**) | 3.2**) |
| drying capacity | 157 | 148 | 175 |
| rinsing aiding performance | 56.9 | 57.3 | n.d. |
| fatty residues | 4.0 | 6.1 | 5.3 |

*)The ingredients were added according to their active component content in wt.-%.

**)Sodium sulfate is added as a filler for a constant mass balance of the detergent composition, without a function and without influence on the preformance of the detergent composition.

From the results in the above table A it is evident that the use of the detergent composition for machine dishwashing F2 leads to beneficial values of the drying capacity and fatty residues in the machine compartment compared to compositions F1 and F3 and further beneficial values for the rinse aiding performance compared to F1.

Moreover, the formulation F2 shows an excellent cleaning performance and excellent filter cleaning properties.

The invention claimed is:

1. A detergent composition for machine dishwashing comprising

Z1) a mixture of ethoxylated glycerol esters of formula (I), (I)

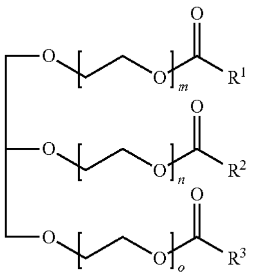

prepared from ethylene oxide and one or more triglycerides of formula (II)

(II)

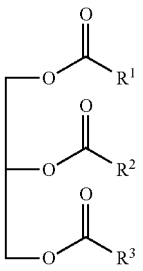

in the presence of a calcium catalyst (C), wherein $R^1$, $R^2$ and $R^3$ in formulae (I) and (II) are each independently selected from the group consisting of saturated linear $C_7$-$C_{24}$ alkyl chains, saturated branched $C_7$-$C_{24}$ alkyl chains, unsaturated linear $C_7$-$C_{24}$ alkyl chains, and unsaturated branched $C_7$-$C_{24}$ alkyl chains;

m, n and o in formula (I) are each independently an integer number from 1 to 200, with the proviso that the number-average of the sum of m+n+o is greater than 5;

the mixture of ethoxylated glycerol esters of formula (I) has a hydroxyl value of less than 6 mg KOH/g;

a ratio of $CH_2OH$ groups to alkyl-$CH_3$ groups in the mixture of ethoxylated glycerol esters Z1) is less than 0.12; and the calcium catalyst (C) is a catalyst obtained by a reaction comprising (A) calcium hydroxide and (B) a carboxylic acid comprising 3 to 40 carbon atoms, wherein the calcium hydroxide (A) and the carboxylic acid (B) are present in a molar ratio (A):(B) of from 1:1 to 1:5.

2. The detergent composition according to claim 1, wherein the reaction comprising components (A) and (B) further comprises an alcohol solvent having 1 to 5 carbon atoms or a mixture thereof with water.

3. The detergent composition according to claim 1, wherein the carboxylic acid (B) comprising 3 to 40 carbon atoms is of the formula (III) or formula (IV), (III)

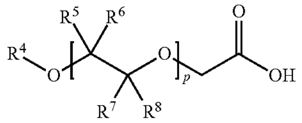

(IV)

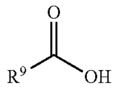

wherein $R^4$ in formula (III) is selected from the group consisting of saturated linear $C_1$-$C_{30}$ alkyl chains, saturated branched $C_1$-$C_{30}$ alkyl chains, unsaturated linear $C_1$-$C_{30}$ alkyl chains, and unsaturated branched $C_1$-$C_{30}$ alkyl chains;

$R^5$, $R^6$, $R^7$ and $R^8$ in formula (III) are each independently selected from the group consisting of hydrogen, methyl, and ethyl;

p in formula (III) is an integer number from 0 to 20; and $R^9$ in formula (IV) is selected from the group consisting of saturated linear $C_5$-$C_{30}$ alkyl chains, saturated branched $C_5$-$C_{30}$ alkyl chains, unsaturated linear $C_5$-$C_{30}$ alkyl chains, and unsaturated branched $C_5$-$C_{30}$ alkyl.

4. The detergent composition according to claim 1, wherein the reaction comprising components (A) and (B) further comprises an acid (AC) having a $pK_A$ value of 3 or less, where (A) and (AC) are present in a molar ratio (A):(AC) of from 5:1 to 1:1.

5. The detergent composition according to claim 1, wherein volatile components are removed from the catalyst (C) before the catalyst (C) is used for the preparation of the ethoxylated glycerol esters of formula (I).

6. The detergent composition according to claim 1, wherein the content of $Ca^{2+}$ ions in the catalyst (C) is between 0.5 wt.-% and 5 wt.-%, based on the total weight of the catalyst (C).

7. The detergent composition according to claim 1, further comprising one or more components selected from the group consisting of:

Z2) one or more enzymes;

Z3) one or more builders;

Z4) one or more bleaching agents;

Z5) one or more surfactants;

Z6) one or more polymers; and

Z7) one or more further additives.

8. The detergent composition according to claim 7, wherein the detergent composition comprises from 0.1-15 wt.-% of the mixture of ethoxylated glycerol esters of formula (I) Z1), from $1\times10^{-6}$ to 5 wt.-% of the at least one enzyme component Z2), from 2 to 50 wt.-% of the at least one builder Z3), from 1 to 40 wt.-% of the at least one bleaching agent Z4), from 0 to 15 wt.-% of the at least one surfactant Z5), from 0 to 10 wt.-% of the at least one polymer Z6), and from 0 to 70 wt.-% of the at least one further additive Z7), based on the total weight of the detergent composition.

9. The detergent composition according to claim 1, wherein the detergent composition is a solid composition at 20° C.

10. The detergent composition according to claim 1, wherein the detergent composition is wrapped in a water-soluble foil.

11. The detergent composition according to claim 1, wherein the detergent composition is a powder, gel, pod, cap, or liquid rinse aid.

12. The detergent composition of claim 1, wherein the ratio of $CH_2OH$ groups to alkyl-$CH_3$ groups in the mixture of ethoxylated glycerol esters Z1) is less than 0.08.

13. The detergent composition of claim 1, wherein the ratio of $CH_2OH$ groups to alkyl-$CH_3$ groups in the mixture of ethoxylated glycerol esters Z1) is less than 0.06.

14. The detergent composition of claim 1, wherein the mixture of ethoxylated glycerol esters Z1) has a hydroxyl value of less than 5 mg KOH/g.

15. The detergent composition of claim 1, wherein the mixture of ethoxylated glycerol esters of formula (I) has a hydroxyl value of less than 5 mg KOH/g; and the ratio of $CH_2OH$ groups to alkyl-$CH_3$ groups in the mixture of ethoxylated glycerol esters Z1) is less than 0.06.

16. A method of cleaning dishes in a dishwashing machine, the method comprising treating contaminated dishes in the dishwashing machine with an aqueous alkaline solution comprising a detergent composition, wherein the detergent composition comprises Z1) a mixture of ethoxylated glycerol esters of formula (I), (I)

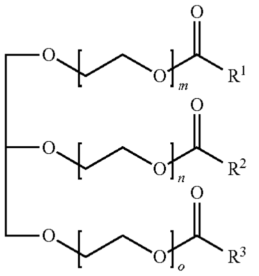

prepared from ethylene oxide and one or more triglycerides of formula (II)

(II)

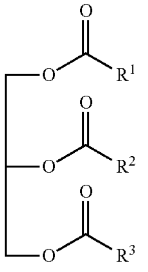

in the presence of a calcium catalyst (C), wherein $R^1$, $R^2$ and $R^3$ in formulae (I) and (II) are each independently selected from the group consisting of saturated linear $C_7$-$C_{24}$ alkyl chains, saturated branched $C_7$-$C_{24}$ alkyl chains, unsaturated linear $C_7$-$C_{24}$ alkyl chains, and unsaturated branched $C_7$-$C_{24}$ alkyl chains;

m, n and o in formula (I) are each independently an integer number from 1 to 200, with the proviso that the number-average of the sum of m+n+o is greater than 5;

the mixture of ethoxylated glycerol esters of formula (I) has a hydroxyl value of less than 6 mg KOH/g;

a ratio of $CH_2OH$ groups to alkyl-$CH_3$ groups in the mixture of ethoxylated glycerol esters Z1) is less than 0.12; and the calcium catalyst (C) is a catalyst obtained by a reaction comprising (A) calcium hydroxide and (B) a carboxylic acid comprising 3 to 40 carbon atoms, wherein the calcium hydroxide (A) and the carboxylic acid (B) are present in a molar ratio (A):(B) of from 1:1 to 1:5.

17. The method according to claim 16, wherein the aqueous alkaline solution has a pH of from 8 to 13.

18. A method of cleaning dishes in a dishwashing machine, the method comprising treating contaminated dishes in the dishwashing machine with an aqueous composition comprising a detergent composition, wherein the detergent composition comprises Z1) a mixture of ethoxylated glycerol esters of formula (I), (I)

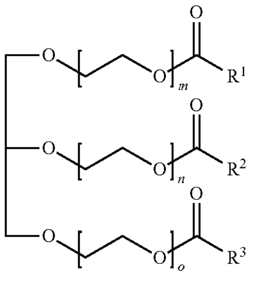

prepared from ethylene oxide and one or more triglycerides of formula (II)

(II)

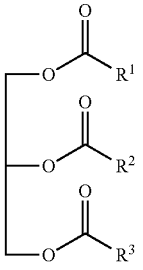

in the presence of a calcium catalyst (C), wherein $R^1$, $R^2$ and $R^3$ in formulae (I) and (II) are each independently selected from the group consisting of saturated linear $C_7$-$C_{24}$ alkyl chains, saturated branched $C_7$-$C_{24}$ alkyl chains, unsaturated linear $C_7$-$C_{24}$ alkyl chains, and unsaturated branched $C_7$-$C_{24}$ alkyl chains;

m, n and o in formula (I) are each independently an integer number from 1 to 200, with the proviso that the number-average of the sum of m+n+o is greater than 5;

the mixture of ethoxylated glycerol esters of formula (I) has a hydroxyl value of less than 6 mg KOH/g;

a ratio of $CH_2OH$ groups to alkyl-$CH_3$ groups in the mixture of ethoxylated glycerol esters Z1) is less than 0.12; and the calcium catalyst (C) is a catalyst obtained by a reaction comprising (A) calcium hydroxide and (B) a carboxylic acid comprising 3 to 40 carbon atoms, wherein the calcium hydroxide (A) and the carboxylic acid (B) are present in a molar ratio (A):(B) of from 1:1 to 1:5, and wherein the aqueous composition has a pH of from 5.5-8.5.

* * * * *